United States Patent Office 2,875,200
Patented Feb. 24, 1959

2,875,200
9α - HALO - 11β,21 - DIHYDROXY - 4,17(20) - PREGNADIENE-3-ONE COMPOUNDS AND PROCESS OF PREPARING THEREOF

John A. Hogg and Frank H. Lincoln, Jr., Kalamazoo Township, Kalamazoo County, Mich., assignors to The Upjohn Company, Kalamazoo, Mich., a corporation of Michigan No Drawing. Application December 17, 1954
Serial No. 476,061

53 Claims. (Cl. 260—239.55)

This invention relates to a novel process for the production of intermediates convertible to 21-esters of 9α-halohydrocortisone, to a process for the production of 21-esters of 9α-halohydrocortisone, and to the novel intermediates thus produced.

It is an object of the present invention to provide a process for the production of intermediates convertible to 21-esters of 9α-halohydrocortisone. Another object is the provision of a process for the production of 21-esters of 9α-halohydrocortisone. A further object is the provision of compounds convertible to 21-esters of 9α-halohydrocortisone. Other objects will be apparent to those skilled in the art to which this invention pertains.

According to the present invention, a 21-ester of 3-keto - 9:11 - β - oxido - 4,17(20) - pregnadiene - 21 - oic acid is converted to a 21-ester of 9α-halohydrocortisone by the following reactions: first, cleavage of the 9:11-β-oxido group with hydrochloric acid or hydrofluoric acid to produce 3-keto-9α-halo-11β-hydroxy-4,17(20)-pregnadiene-21-oic acid ester. The keto group of this latter compound is then protected with a reduction stable ketonic derivative and the compound then reduced with lithium aluminum hydride or other suitable chemical carbonyl reducing agent to product a 9α-halo-11β,21-dihydroxy-4,17(20)-pregnadiene-3-one, the keto group of which is still protected by the ketonic derivative. Removal of this ketone protecting group in an appropriate manner, as by hydrolysis, prdouces a 9α-halo-11β,21-dihydroxy-4,17(20)-pregnadiene-3-one. Esterification of this compound with an acylating agent produces the corresponding 9α - halo - 11β - hydroxy - 21 - acyloxy-4,17(20) - pregnadiene - 3 - one. Oxidative hydroxylation of this compound with osmium tetroxide and an oxidizing agent produces a 21-ester of 9α-halohydrocortisone.

These reactions may be graphically exemplified as follows:

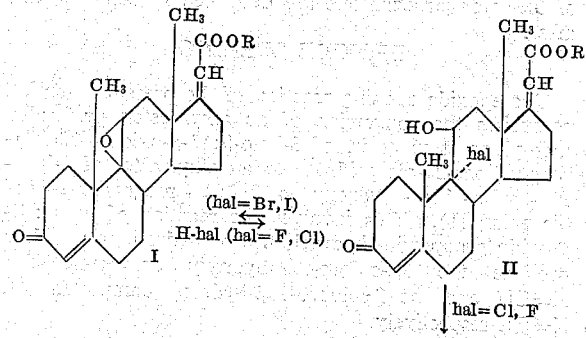

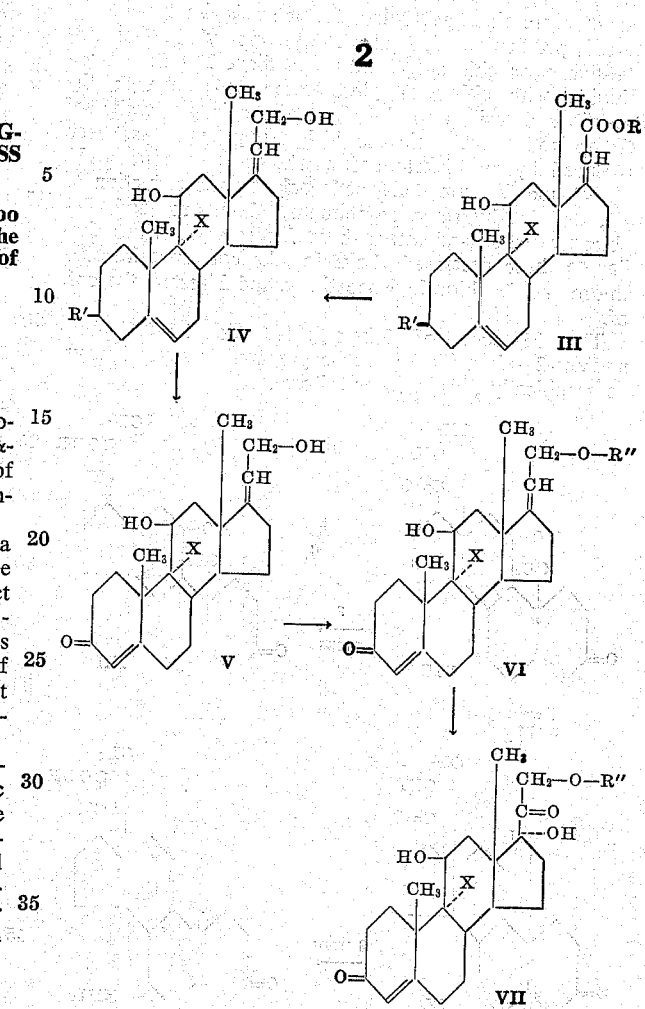

wherein —COOR is an esterified carboxylic acid radical, hal is fluorine, chlorine, bromine or iodine, X is chlorine or fluorine, R' is a reduction stable ketonic derivative, in this instance, illustratively exemplified as a ketal, and —CH₂—O—R" is an esterified hydroxy group. Alternatively, the reduction stable ketonic derivative could be an enol ether or an enamine, in which case there would additionally be a 3(4) double bond in the structures of III and IV.

The thus-produced esters of 9α-halohydrocortisone can be hydrolyzed to the known 9α-halohydrocortisones, compounds known to have enhanced and modified adrenal cortical hormone activity, as compared to the naturally occurring adrenal cortical hormones, including anti-inflammatory, mineral corticoid and salt retention activity. Many of the esters of 9α-halohydrocortisone which can be prepared according to the process of the present invention are superior to hydrocortisone, cortisone and/or 9α-fluorohydrocortisone, with respect to duration of activity, intensity of activity, onset of activity, toxicity, incident of side-effects, or have some other modification of activity which renders them particularly valuable agents in a particular route of administration or in treatments requiring a particular activity pattern.

Introduction of an oxidation step in the reactions described above, i. e., by the oxidation of Compound VI or VII, with, for example, chromic acid, N-bromoacetamide or N-bromosuccinimide, or other oxidizing agent which will oxidize an 11β-hydroxy group to an 11-keto group without materially affecting the other functional groups in the molecule, is ultimately productive of esters of 9α-fluoro or chlorocortisone. Oxidation of a compound represented by Formula II with N-bromoacetamide, according to methods known in the art, is productive of an alkyl, e. g., methyl, 3,11-diketo-9α-fluoro or chloro-4,17(20)-pregnadiene-21-oate. Continuing with either of these compounds through the reactions described in the chart above is productive of Compound III wherein the 11-hydroxy group has been replaced by an 11-keto group whereas Compounds IV, V, VI and VII are converted back, by the reduction of III, to 11β-hydroxy compounds. 9α-fluoro and 9α-chlorocortisone and esters thereof possess activities similar to those described above for the corresponding 9α-fluoro and 9α-chlorohydrocortisone and 21-esters thereof.

The 21-esters of 3-keto-9:11-β-oxido-4,17(20)-pregnadiene-21-oic acid (I) can be prepared in several ways, as graphically illustrated as follows:

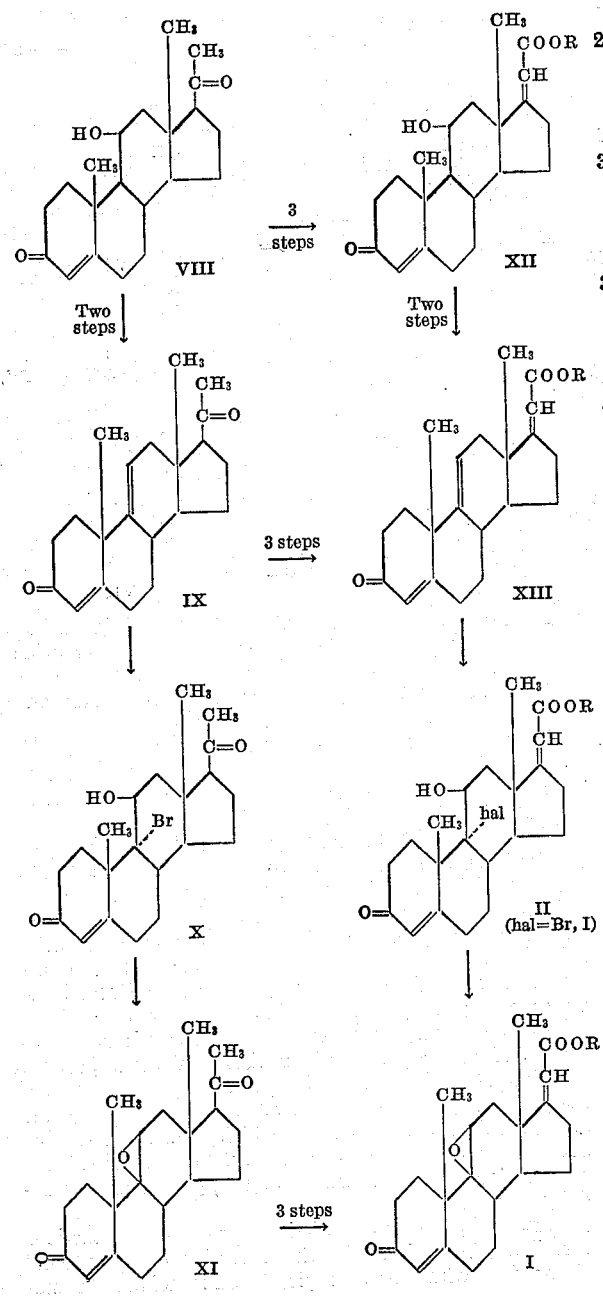

For example, reacting a 3-keto-4,9(11),17(20)-pregnatriene-21-oic acid ester (XIII) with hypobromous acid or hypoiodous acid in the manner described hereinafter is productive of 3-keto-9α-halo-11β-hydroxy-4,17(20)-pregnadiene-21-oic acid ester (II, hal=Br or I). Removal of hydrogen halide from the molecule produces the corresponding 3 - keto - 9:11 - β - oxido - 4,17(20) - pregnadiene-21-oic acid ester, the starting compound of the present invention, all as disclosed more fully hereinafter.

The 3-keto-4,9(11),17(20)-pregnatriene-21-oic acid ester (XIII) can be prepared from 11α-hydroxyprogesterone (VIII) by monoglyoxalation with diethyl oxalate and sodium methoxide, dibromination with bromine, followed by rearrangement and elimination with sodium methoxide in methanol to produce 3-keto-11α-hydroxy-4,17(20)-pregnadiene-21-oic acid methyl ester (XII). Dehydration, for example, by tosylation followed by heating with base, of XII is productive of 3-keto-4,9(11),17(20)-pregnatriene-21-oic acid methyl ester (XIII). Alternatively, starting with 9(11)-dehydroprogesterone (IX) and performing these same reactions, with the exception of the dehydration reaction, on this starting compound, is also productive of 3-keto-4,9(11),17(20)-pregnatriene-21-oic acid methyl ester. The production of 3-keto-4,9(11), 17(20)-pregnatriene-21-oic acid esters by this latter route is disclosed in the copending application of Hogg et al., S. N. 307,385, now U. S. Patent 2,774,776, and the compounds claimed in the copending application of Hogg et al., S. N. 476,057, filed December 17, 1954, now U. S. Patent 2,771,475.

Substituting 9:11-β-oxidoprogesterone (XI) for the 11α-hydroxyprogesterone (VIII) as the starting steroid in the reactions described above, but eliminating the dehydration step, is productive of 3-keto-9:11-β-oxido-4,17-(20)-pregnatriene-21-oic acid methyl ester (I).

Saponifying methyl 3-keto-9:11-β-oxido-4,17(20)-pregnadiene-21-oate and reesterifying with the selected alcohol, or by ester exchange of the methyl ester, or other esterifying techniques known in the art, other esters of 3-keto-9:11-β-oxido-4,17(20)-pregnadiene-21-oic acid can be prepared, especially the lower-alkyl esters, e. g., ethyl, propyl, isopropyl, butyl, isobutyl, amyl, isoamyl, hexyl, heptyl, octyl.

Alternatively, 3 - keto - 9:11 - β - oxido - 4,17(20)-pregnadiene-21-oic acid methyl ester (I) can be prepared by reacting 9:11-β-oxidoprogesterone (XI) with a large excess of diethyl oxalate and sodium methoxide to produce 2,21-diethoxyoxalyl-9:11-β-oxido-progesterone sodium dienolate. Tribrominating this compound with three molar equivalents of bromine followed by reaction with sodium methoxide and methanol is productive of 2 - bromo - 3 - keto - 9:11 - β - oxido - 4,17(20) - pregnadiene-21-oic acid methyl ester which is debrominated with zinc and acetic acid to produce 3-keto-9:11-β-oxido-4,17(20)-pregnadiene-21-oic acid methyl ester (I), all as claimed in the copending application of Hogg et al., S. N. 346,274, filed April 1, 1953, now U. S. Patent 2,790,814.

An exemplary preparation of the starting compounds of the present invention (I) is shown in the preparations and the reactions of the present invention which convert this starting compound to the physiologically active esters of 9α-halohydrocortisone are described in detail hereinafter.

EPOXIDE OPENING

The epoxide opening reaction of the present invention comprises the conversion of an alkyl ester, preferably methyl or ethyl ester, of 3-keto-9:11-β-oxido-4,17(20)-pregnadiene-21-oic acid (I) to an alkyl ester of 3-keto-9α - halo - 11β - hydroxy - 4,17(20) - pregnadiene - 21-oic acid (II). This involves the reaction of the 9:11-β-oxido group with hydrochloric or hydrofluoric acid to produce the 9α-chloro-11β-hydroxy compound (II, X=Cl) and the 9α-fluoro-11β-hydroxy compound (II, X=F), respectively.

The opening of a steroidal oxide with hydrochloric acid or hydrobromic acid is described by Schmidlin et al., Helv. Chim. Acta 36, 1241 (1953). Other references to such reactions include Gallagher, J. Biol. Chem. 162, 495 (1946); Cornforth et al., J. Chem. Soc. 1954, 907; and Fried et al., J. Am. Chem. Soc. 75, 2273 (1953). The latter reference reporting the opening of a steroidal oxide with hydrofluoric acid.

The 9:11-β-oxide of Compound I when reacted with hydrofluoric or hydrochloric acid produces a 9α-halo-11β-hydroxy steroid (II, hal=F, Cl). A preferred technique for the opening of the 9:11-β-oxide of II involves the reaction of a solution of the oxide with anhydrous hydrogen chloride or hydrogen fluoride in an anhydrous, inert, preferably alcohol-free solvent, e. g., chloroform, methylene chloride, carbon tetrachloride, benzene, hexane, heptane, diethyl ether, acetic acid. The halogenated hydrocarbons, especially chloroform, are preferred.

Ordinarily, operating temperatures, when employing hydrogen fluoride, are between about minus sixty and about plus twenty degrees centigrade. Higher temperatures, while to a certain extent operable, result in an inordinate amount of side reactions, as would be apparent to those skilled in the art. Lower temperatures are accompanied by the problems of steroid solubility and unduly long reaction times. When hydrogen chloride is employed, because of its lesser reactivity, the choice of reaction temperatures is somewhat less limited, in some instances being practical up to about plus sixty degrees centigrade. The preferred operating temperatures for either reactant is preferably below room temperature and, for hydrogen fluoride at least, below zero degrees centigrade.

Reaction times required to achieve substantially complete reaction are ordinarily less than about eight hours for hydrogen fluoride and less than about 24 hours for hydrogen chloride. If a molar equivalent of the hydrogen halide is employed, the reaction time is not critical, after reaction at the oxide is substantially complete. However, when an excess of hydrogen halide is employed, particularly with hydrogen fluoride, the reaction temperature should be relatively short, e. g., less than about six hours at minus fifteen degrees centigrade.

As stated above, the reaction can be performed in the presence of an excess of the hydrogen halide. It appears, however, that optimum yields are obtained, especially when hydrogen fluoride is employed, when about a molar equivalent of hydrogen halide per mole of steroid oxide (I) is employed. Alternatively, the hydrogen halide can be employed in excess of a molar equivalent and the excess destroyed when the desired oxide opening reaction is substantially complete.

KETONE PROTECTION

The ketone protection reaction of the present invention involves the protection of the 3-keto group from reduction in the reduction step of the present invention. The 3-keto group is therefore protected by a reduction stable ketonic derivative. In the illustrative process shown above, the selected 3-keto-9α-halo-11β-hydroxy-4,17(20)-pregnadiene-21-oic acid ester (II) is converted to the corresponding 3-ketal (III). The reduction stable ketonic derivatives include the 3-dialkyl ketals, 3-cyclic ketals, 3-hemithioketals, 3-cyclic dithioketals, 3-enol ethers, 3-thioenol ethers, 3-enamines, or other reduction stable ketonic derivative readily reconvertible to a Δ⁴-3-keto group.

Of the reduction stable ketonic derivatives, the 3-cyclic ketals are preferred, especially the 3-cyclic ketals produced from an alkane-α-diol or alkane-β-diol containing less than nine carbon atoms. These preferred 3-cyclic ketals of the 3-keto-9α-fluoro-11β-hydroxy-4,17(20)-pregnadiene-21-oic acid esters of the present invention may be represented by the following structural formula:

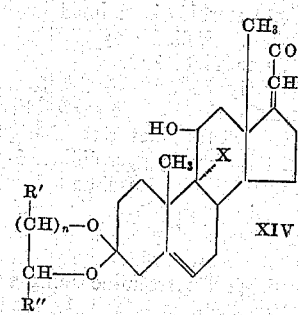

wherein X and R have the values given hereinbefore, R' and R" are each hydrogen or an alkyl group containing less than seven carbon atoms and $n$ is a whole number from one to two, with the R'—(CH)$_n$—CH—R" divalent radical always containing a total of less than nine carbon atoms. Especially preferred are those steroids represented by XIV wherein R' and R" are both hydrogen, i. e., the cyclic ketals produced by the reaction of the selected steroid (II) with ethylene glycol, trimethylene glycol, preferably ethylene glycol.

Other 3-ketals include the 3-dialkyl ketals, which are somewhat more difficult to prepare in view of their tendency to be converted to 3-enol ethers. This tendency can be overcome to a certain extent by employing boron trifluoride as the reaction catalyst and less rigorous reaction conditions. The 3-hemithiocyclic ketals, e. g., those produced from the reaction of II with mercaptoethanol or β-mercaptopropanol, and the 3-cyclic thioketals, e. g., those produced from the reaction of II with ethylene dimercaptan or propylene dimercaptan are also useful ketone protecting groups.

The enol ethers include the 3-alkyl, 3-alkylthio, 3-benzyl and 3-benzylthio enol ethers. These may be represented by Formula III, with an additional double bond in the 3(4) position, with R' representing an alkoxy group, an alkylmercapto group, an arylalkoxy group or an arylalkylmercapto group. Preferred among the enol ether groups are the methyl enol ether, the ethyl enol ether, the benzyl enol ether, the ethyl thioenol ether, and the benzyl thioenol ether.

Another reduction stable ketonic derivative which may be employed in the process of the present invention are the enamines. These compounds may be represented by Formula III, with an additional double bond at the 3(4) position, with R" representing a disubstituted amino radical, e. g., pyrrolidyl, piperidyl, morpholyl, and the dialkyl-amino radicals, e. g., diallylamino, diethylamino, dimethylamino, etc. Of the enamines, the compounds wherein the disubstituted amino radical is pyrrolidyl are preferred.

The usual operating conditions for the preparation of any of these reduction stable ketonic derivatives involves the reaction of the starting Δ⁴-3-keto (II) with the selected alcohol, polyhydric alcohol, mercaptoalcohol, dimercaptan or secondary amine, usually in an inert substantially anhydrous organic diluent. The reaction temperature is usually the refluxing temperature of the selected solvent, e. g., the boiling point of benzene or toluene, and the water of reaction is advantageously removed from the reaction as it is formed, e. g., as an azeotrope with the selected water-immiscible solvent. Reaction temperatures from about 25 degrees centigrade to about 200 degrees centigrade are ordinarily employed.

The reaction is advantageously performed in the presence of an acidic catalyst, e. g., para-toluenesulfonic acid, hydrogen chloride, sulfuric acid, boron trifluoride, sodium acid sulfate, etc. In the case of the enamines, catalyst is not needed, but is desirable. If the water of reaction is removed from the reaction mixture, as suggested above, the time required to achieve the removal of about a molar equivalent of water is a convenient calculation of the desired reaction time. Ordinarily, the reaction is preferably run for at least several hours. The preparation of enamines of Δ⁴-3-keto steroids is claimed in the copending application S. N. 288,546, filed May 17, 1952, of Herr and Heyl, now U. S. Patent 2,781,342.

Amines which may be used in the formation of an enamine ketonic derivative include pyrrolidine, piperidine, C-alkyl substituted pyrrolidines and C-alkyl substituted piperidines, e. g. 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine and other lower-alkyl C-substituted pyrrolidines and piperidines. Of these amines pyrrolidine and piperidine are preferred, with pyrrolidine being especially preferred. The selected amine is usually used in a molar excess, calculated on the starting steroid, to achieve the optimum yield of enamine product. The preferred proportion of amine to starting steroid is usually from about 1.1 to about seven moles of amine per mole of steroid and especially from about 1.1 to 2 moles per mole of steroid.

The choice of a particular catalyst in the enamine formation reaction does not appear to be critical since the reaction proceeds in the absence of a catalyst. However, for a substantially complete and rapid reaction, use of a catalyst, preferably a sulfonic acid, e. g., para-toluenesulfonic acid, is preferred.

Moisture in the reaction mixture is detrimental to the procurement of high yields of product and preferred reaction conditions include removal of the water formed during the enamine formation. This is conveniently accomplished by performing the reaction in a water-immiscible solvent and co-distilling the solvent and water as it is formed. Alternatively, the water may be removed by drying agents, e. g., by passing the refluxing solvent, either as the distilling vapor or as the condensate, or both, through a drying agent, e. g., calcium carbide, anhydrous calcium sulfate, anhydrous potassium carbonate, or the like.

Although the reaction may sometimes be performed at room temperature or lower, it is preferably conducted above room temperature, e. g., between about 25 and about 150 degrees centigrade, such temperature conveniently being at or about the boiling point of the reaction mixture.

Reaction times may vary between about a few minutes to several days, depending in part upon the reaction solvent, ratio of reactants, selected amine, and water removal. When a 3-keto-9α-halo-11β-hydroxy-4,17(20)-pregnadiene-21-oic acid methyl ester and an excess of pyrrolidine are reacted in refluxing benzene accompanied by removal of the water of reaction with para-toluenesulfonic acid being used as catalyst, formation of the 3-enamine is substantially complete in less than 1.5 hours.

Reaction solvents which may be employed are preferably the water-immiscible aromatic hydrocarbons and halogenated hydrocarbons, e. g., benzene, toluene, xylene, chlorobenzene, and the like, although other solvents such as, for example, pentane, hexane, chloroform, methylene chloride, carbon tetrachloride, and the water-miscible solvents, e. g., methanol, ethanol, tertiary butyl alcohol, tetrahydrofuran, dioxane, and other solvents may be used. If a water-miscible solvent is employed, the removal of the water of reaction is conveniently achieved by the use of a drying agent.

REDUCTION

The reduction step of the process of the present invention, i. e., reduction of the thus-produced 3-ketone protected 3-keto-9α-halo-11β-hydroxy-4,17(20)-pregnadiene-21-oic acid ester, e. g., III, with lithium aluminum hydride or equivalent chemical carboxyl reducing agent in an organic solvent, e. g., ether, dioxane, tetrahydrofuran, benzene, hexane, mixtures of these and others, preferably ether, preferably followed by decomposition (e. g. hydrolysis) of any excess lithium aluminum hydride or organo-metal complexes, which may be present, converts the 21-oic acid ester group to a 21-hydroxy group ordinarily without affecting the 3-ketone protecting group. The reaction requires at least one mole of lithium aluminum hydride for every mole of steriod, but the lithium aluminum hydride is usually employed in substantial excess of this theoretical amount to ensure optimum yields of desired product. When the steroid and lithium aluminum hydride have been thoroughly mixed, preferably with cooling, the reaction is essentially complete. Continued stirring or heating or both are sometimes employed, however, to ensure completeness of reaction, although heating is usually not necessary and sometimes detrimental. The excess lithium aluminum hydride and any steroid-metal complex which may be present is preferably decomposed, e. g., by the careful addition of water, an alcohol or carbonyl compound, e. g., ethanol or acetone, to the reaction mixture. If a water-immiscible solvent is employed, the resulting steroid product may be isolated by adding water and then separating the organic phase from the aqueous phase and then distilling the solvent from the separated layer, or if a water-miscible solvent is employed, by adding sufficient water to precipitate the steriod from the mixture and thereafter separating the steroid therefrom in conventional manner. In either case the steriod product may be recovered by distilling the organic solvent from the reaction mixture.

A preferred procedure comprises reacting the starting 3-ketone protected 3-keto-9α-halo-11β-hydroxy-4,17(20)-pregnadiene-21-oic acid ester, e. g., II, with lithium aluminum hydride at a temperature substantially below room temperature, i. e., below twenty degrees centigrade, and then decomposing any excess lithium aluminum hydride and organo-metal complexes thus-formed which may be present with water of organic carbonyl compound. A low reaction temperature ensures a minimum of side reactions. Water rather than acid is preferred for decomposition of the reaction complex, especially if the 3-ketone protected 11β,21-dihydroxy-4,17(20)-pregnadiene-3-one, e. g., IV, is to be isolated since this compound is stable under the ensuing conditions when water is used, and the decomposition, using water, is not accompanied by as great a heat of reaction as it is when acid is used for decomposition of the organo-metal complexes which may be present and any excess lithium aluminum hydride. The use of water and low decomposition temperatures is important if the reduction stable ketone protecting group is a 3-enamine since this group is sensitive to heat and acid in aqueous solution. Frequently, the reaction product is somewhat decomposed into non-crystalline non-identifiable products when exposed to acid and heat or the ketone protecting group is somewhat hydrolyzed, thus producing a heterogeneous reaction product, and the reaction is therefore preferably conducted in the absence of acid.

HYDROLYSIS

The hydrolysis step of the process of the present invention involves the removal of the reduction stable ketonic derivative at the 3-position to regenerate the Δ⁴-3-keto group. This hydrolysis ordinarily involves water, although other ketone regenerating techniques involving removal by interchange reaction with a large excess of acetone or acetaldehyde, in the presence of, for example, para-toluenesulfonic acid, may be employed.

If water is the hydrolyzing or ketone regenerating agent, the conditions necessary to achieve satisfactory hydrolysis depend somewhat upon the reduction stable ketonic derivative employed. For example, if a ketal or enol ether is the protecting group, the hydrolysis ordinarily requires acidic aqueous conditions. A 3-enamine, however, is susceptible to alkaline hydrolysis. Since the mixture resulting from an aqueous decomposition of any organo-metal complexes and excess lithium aluminum hydride remaining after the reduction step is alkaline, when the ketone protecting group is an enamine, prolonged contact with the thus-produced 3-amino-9α-halo-11β,21-dihydroxy-2,4,17(20)-pregnatriene with the total reaction mixture may result in the hydrolysis of the 3-amino group, thus-producing a 9α-halo-11β,21-dihydroxy-4,17(20)-pregnadiene-3-one (V). In this case, the reduction step and the hydrolysis of the present invention become substantially one step since they are performed concurrently, or at least by a continuous reaction.

Although, in the hydrolysis of a 3-enamine to regenerate the Δ⁴-3-keto group, either organic or mineral acids may be used, mineral acids do not appear to give as clear cut a reaction as organic acids, for example, buffered acetic acid. Bases are preferred over acids for the hydrolysis of the enamine group since the hydrolysis reaction is usually a faster, cleaner reaction under alkaline conditions. Even neutral conditions may be employed if the reaction time is of sufficient duration or the reaction temperature is sufficiently high. For example, the 3-enamine group can be converted to a Δ⁴-3-keto group by heating the selected 3-enamine steroid for about eighteen hours in refluxing 95 percent methanol. If a small amount of base is added, e. g., sodium hydroxide, potassium carbonate, sodium bicarbonate, or the like, the reaction is usually complete in less than an hour at about thirty degrees centigrade. Acidification of the resulting mixture and separation of the organic layer, if water-immiscible, or extraction of the resulting solution with methylene chloride, benzene or the like, if water-miscible, and then distilling the solvent therefrom, separates the thus-produced 9α-halo-11β,21-dihydroxy-4,17(20)-pregnadiene-3-one (V).

The hydrolysis of a 3-dialkyl ketal, cyclic ketal, enol ether, thioenol ether, hemithioketal, or dithioketal to regenerate a Δ⁴-3-keto group, in this instance to produce 9α - halo - 11β,21 - dihydroxy - 4,17(20) - pregnadiene-3-one, can be performed according to the well known reaction conditions known in the art. The hydrolysis is ordinarily an acidic one, since these protecting groups are quite stable to base. The more rigorous reaction conditions should be avoided however, to prevent undue alteration of the steroidal structure at other parts of the molecule, e. g., at carbon atom 11, 17 or 21.

ESTERIFICATION

The esterification step of the process of the present invention involves the conversion of the 21-hydroxy group of 9α-halo-11β,21-dihydroxy-4,17(20)-pregnadiene-3-one (V) to a 21-ester group (VI). This can be performed under the esterification conditions known in the art, e. g., by the reaction of V with the selected acid anhydride or acid chloride, preferably in the presence of pyridine or other N-cycloaromatic tertiary amine; with the free acid, e. g., formic acid or other weaker acid in the presence of an esterification catalyst, e. g., para-toluenesulfonic acid or sulfuric acid; with an ester by ester interchange reaction; or by reaction with the ketene of the selected acid. Since the 11β-hydroxy group is relatively labile, reaction conditions which are not apt to cause dehydration, or alteration in some other manner, of the 11β-hydroxy group are preferred. The preferred esterification reagent is acetic anhydride, preferably in the presence of pyridine, producing a compound represented by Formula VI wherein R″ is acetyl.

OXIDATIVE HYDROXYLATION

The oxidative hydroxylation step of the present invention consists of the concomitant reaction of a 9α-halo-11α - hydroxy - 21 - acyloxy - 4,17(20) - pregnadiene - 3-one (VI) with a hydroxylating agent and an oxidizing agent to produce a 9α-halo-11β,17α-dihydroxy-21-acyloxy-4-pregnene-3,20-dione (VII).

The hydroxylation of a Δ¹⁷⁽²⁰⁾-21-acyloxy steroid to produce a 17α,20-dihydroxy steroid is a well known reaction. See, for example, Ruzicka and Mueller, Helv. Chim. Acta 22, 57 (1939), and U. S. Patent 2,492,194. In this reaction, a metal oxide is ordinarily employed to add to the double bond to produce, upon hydrolysis, a glycol. Osmium tetroxide is ordinarily the metal oxide of choice. For a discussion of the hydroxylating abilities of the metal oxides, preferably from sub-groups IV, V and VI of the periodic table, see Milas, J. Am. Chem. Soc. 59, 2342 (1937), and Mugden and Young, J. Chem. Soc. 1944, 2988. Examples of other hydroxylating metal oxides or derivatives thereof include osmium tetroxide, manganese dioxide, vanadium pentoxide, chromium trioxide, pertungstic acid, permolybdic acid, selenium dioxide, etc.

The first recognized example of an oxidative hydroxylation of a steriod is found in Prins and Reichstein, Helv. Chim. Acta 25, 300 (1942). There is reported, using osmium tetroxide and chloric acid, the oxidative hydroxylation of a Δ²⁰⁽²¹⁾ steroid to produce a 20-keto-21-hydroxy steroid. The concept of oxidative hydroxylation outside the field of steroidal chemistry was first demonstrated, employing a catalytic amount of osmium tetroxide with hydrogen peroxide, by Crigee, Annalen der Chemie 522, 75 (1936).

Oxidizing agents which may be employed in the oxidative hydroxylation step of the present invention are the oxidizing agents which contribute an oxygen atom to the reaction and include, hydrogen peroxide, alkyl peroxides, peracids, chloric acid, periodic acid, acetyl peroxide, benzoyl peroxide, tertiary amine oxide peroxides, aryliodo oxides, lead tetraacetate, manganese dioxide, mercury diacetate, etc., i. e., oxygen donating oxidizing agents. The use of osmium tetroxide and hydrogen peroxide in the oxidative hydroxylation of certain Δ¹⁷⁽²⁰⁾-21-substituted steroids is claimed in U. S. Patents 2,662,854 and 2,668,816. The use of amine oxide peroxides with osmium tetroxide in the oxidative hydroxylation of Δ¹⁷⁽²⁰⁾-21-acyloxy steroids is claimed in the copending application of Schneider and Hanze, S. N. 424,315, now U. S. Patent 2,769,823, and the use of aryliodo oxides with osmium tetroxide in the oxidative hydroxylation of these same steroids is claimed in the copending application of Schneider, S. N. 443,418. The use of an amine oxide peroxide or an aryliodo oxide as the oxidizing agent in the oxidative hydroxylation of the present invention is preferred. The use of these reagents is discussed more fully below.

The amine oxide peroxides which may be employed in the oxidative hydroxylation step of this invention are prepared by the reaction of some tertiary amines with two molar equivalents of hydrogen peroxide or by the reaction of a tertiary amine oxide with one molar equivalent of hydrogen peroxide. Amine oxide peroxides are a novel class of oxidizing agents. For the most part, they have a higher oxidation potential than the hydrogen peroxide from which they were prepared.

The amine oxide peroxides of the present invention are preferably non-aromatic, i. e., the molecule is devoid of an aromatic group of any kind. The non-aromatic tertiary amine oxide peroxides include the N-alkylcycloalkylamines oxide peroxides, e. g., N-alkylmorpholine oxide peroxide, N-alkylpyrrolidine oxide peroxides, and N-alkylpiperidine oxide peroxides, the trialkylamine oxide peroxides, e. g., trimethylamine oxide peroxide, triethylamine oxide peroxide, methyldiethylamine oxide peroxide, ethyldimethylamine oxide peroxide, the alkanolamine oxide peroxides, e. g., dimethylethanolamine oxide peroxide, pyrrolidylethanol oxide peroxide, piperidylethanol oxide peroxide, etc. Of these amine oxide peroxides, triethylamine oxide peroxide and N-methylmorpholine oxide peroxide are especially advantageous.

The organic polyvalent iodo oxides which may be employed in the oxidative hydroxylation step of this invention are organic iodo compounds having at least one titratable oxygen atom attached to the iodine atoms. The presence of a titratable iodo oxide oxygen atom can be determined in the usual manner with KI, acid and sodium thiosulfate. The known examples of these iodo oxides are iodoso, iodyl and iodoxy compounds and salts thereof. The iodonium compounds are not included in the term "iodo oxides" as used herein since the hydroxy group of the iodonium compounds is ionic in nature and is not therefore directly attached to the iodine atom, but merely associated with it ionically. The iodoso compounds have one oxygen atom attached to the iodine atom; the iodoxy compounds have two oxygen atoms attached.

An excellent reference to these iodo oxides is Willgerodt, "Die Organischem Verbindungen Mit Mehrwertigen Jod," F. Enke, Stuttgart (1914). Many iodo oxides are disclosed in this reference. Other references include R. Sandin, "Organic Compounds of Polyvalent Iodine," Chem. Rev. 32, 249 (1943); Sidgwick, "Chemical Elements and Their Compounds," vol. II, 1243–1260, Oxford Univ. Press (1950); and Mason et al., J. Chem. Soc. 1935, 1669. The latter reference discloses the iodyl compounds.

From these references, it appears that iodo oxides can be prepared from aryl iodo compounds or other vinyl iodides whose double bond is also modified in some way, e. g., by halogenation, as in α-chloro-iodoethylene, chloro-iodofumaric acid or α-chloro-iodoacrylic acid.

Examples of the known aryl iodo oxides include iodosobenzene, phenyliodosoacetate, diphenyliodyl hydroxide and acetate, phenyliodosopropionate, iodoxybenzene, the ring alkylated iodoso and iodoxybenzenes, and the oxides of iodonaphthylene, iodobenzoquinone and iodoanthroquinone, iodobenzoic acid, iodobenzenesulfonic acid, iodobenzaldehyde, iodobenzophenone, iodosalicylic acid, etc. The heterocyclic aryl iodo oxides, e. g., of the pyridine, thiophene and furan series, do not appear to be known, but are included in the term "aryl iodo oxide."

The preferred organic polyvalent iodo oxides employed in the process of the present invention are the carbocyclic aryl iodo oxides. Of these the aryl iodoso compounds are preferred, e. g., iodosobenzene and phenyliodosoacetate, which have been found to give especially good results. The iodoxy compounds, for the most part, are very insoluble in organic solvents, and therefore do not usually give as satisfactory results as the corresponding iodoso compounds with respect to reaction rate and/or yield of 17-hydroxy-20-keto product.

The preferred aryl iodoso compounds are ordinarily prepared by the reaction of any aryl iododichloride with a base, e. g., sodium hydroxide. The aryl iodoso acid salts can be prepared by the reaction of an aryl iodide with the selected organic peracid. The iodoxy compounds are prepared by boiling the corresponding iodoso compounds in water or by oxidizing an aryl iodide with, for example, Caro's acid. The iodyl hydroxides are prepared by the reaction of an aryl iodoxy compound with two molar equivalents of sodium hydroxide in a one normal aqueous solution of sodium hydroxide at zero degrees centigrade for about 1.5 hours. See Mason (loc. cit.). The salts of aryl iodyl hydroxy compounds are prepared by precipitating the aryl iodyl hydroxide as the carbonate and reacting the carbonate with the selected acid.

In carrying out the oxidative hydroxylation step of the invention, the starting steroid is advantageously dissolved in an inert organic solvent, for example, tertiary butyl alcohol, diethyl ether, tetrahydrofuran, or the like, and the hydroxylating agent preferably osmium tetroxide and the oxidizing agent mixed therein. Advantageously, though not necessarily, the hydroxylating agent is added after the addition of the oxidizing agent. Advantageously also, the osmium tetroxide and the oxidizing agent peroxide are added in solutions of the same solvent used as the vehicle used for the reaction.

The amount of the preferred osmium tetroxide hydroxylating agent employed in the reaction can be varied widely, for example, from about 0.2 molar equivalent to 0.001 molar equivalent. Advantageously, however, not more than 0.05 molar equivalent is used.

The amount of oxidizing agent theoretically required to produce a 17-hydroxy-20-keto-21-acyloxy steroid is two oxidizing equivalents for each mole of osmate ester formed in the reaction. It has been found, however, that in the process of this invention, more than the theoretical amount of oxidizing agent is ordinarily necessary to obtain a complete reaction. For optimum results in the process of this invention, therefore, it is usually necessary to use the oxidizing agent in excess of the theoretical amount. For example, optimum results are ordinarily obtained using between about 2.2 and about 2.75 equivalents of amine oxide peroxide or aryl iodo oxide, calculated on the starting steroid. The course of the oxidative hydroxylation reaction can be readily determined by the titration of aliquot portions for residual oxidizing agent. Ordinarily, the presence of small amounts of water in the reaction mixture does not adversely affect the yield of desired product. However, to ensure optimum yields of desired product when employing hydrogen peroxide or an amine oxide peroxide, the reaction advantageously may be performed under substantially anhydrous conditions, e. g., in dry tertiary butyl alcohol, or like solvent.

The reaction temperature for the oxidative hydroxylation step normally is between about fifteen and about thirty degrees centigrade although higher or lower temperatures are operable, e. g., between about minus ten and about plus seventy degrees centigrade. In place of the solvents noted above, there may be used any inert solvent which is a solvent for the reagents. Suitable solvents include diethylether, dioxane, isopropylalcohol, tetrahydrofuran, tertiary butyl alcohol, tertiary amyl alcohol, ethanol and methanol.

The following examples and preparations are illustrative of the process and products of the present invention, but are not to be construed as limiting.

PREPARATION I

*Methyl 3-keto-11α-hydroxy-4,17(20)-pregnadiene-21-oate*

To a stirred solution of 22.60 grams (0.05 mole) of the sodium enolate of 11α-hydroxy-21-ethoxyoxalylprogesterone (U. S. 2,683,724) in 550 milliliters of methanol was added dropwise sixteen grams (0.1 mole) of bromine. To the thus-produced solution of 29.4 grams (0.05 mole) of 11α-hydroxy-21,21-dibromo-21-ethoxyoxalylprogesterone in 550 milliliters of methanol was added a solution of 16.5 grams (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five percent acetone, four of methylene chloride plus ten percent acetone, four of methylene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was recrystallized from a mixture of ethyl acetate and Skellysolve B hexane hydrocarbons to yield crystalline methyl 3-keto-11α-hydroxy-4,17(20)-pregnadiene-21-oate, melting at 205 to 210 degrees centigrade.

*Analysis.*—Calculated for $C_{22}H_{30}O_4$: C, 73.75; H, 8.48. Found: C, 73.77, 74.10; H, 8.38, 8.59.

Similarly, other 3-keto-11α-hydroxy-4,17(20)-pregnadiene-21-oic acid esters are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

PREPARATION 2

Methyl 3-keto-11α-(para-toluenesulfonyloxy)-4,17(20)-pregnadiene-21-oate

A mixture of one gram of methyl 3-keto-11α-hydroxy-4,17(20)-pregnadiene-21-oate, one gram of para-toluenesulfonyl chloride and five milliliters of pyridine were maintained at about 25 degrees centigrade for 72 hours. The mixture was then poured into 100 milliliters of cracked ice and water and the precipitated product separated from the aqueous phase by filtration. The precipitate was dissolved in 75 milliliters of chloroform and the solution washed with fifty milliliters of water. The chloroform solution was then dried over anhydrous sodium sulfate and the chloroform then evaporated. The residue was dissolved in 25 milliliters of chloroform and poured over a chromatographic column of 75 grams of Florisil synthetic magnesium silicate. The column was developed with 100 milliliter portions of solvents of the following composition and order: three of Skellysolve B hexane hydrocarbons plus five percent acetone, three of Skellysolve B plus ten percent acetone, three of Skellysolve B plus twenty percent acetone, three of Skellysolve B plus thirty percent acetone and two of acetone. The Skellysolve B plus thirty percent acetone eluted 1,262 grams, a yield of 88.5 percent of the theoretical, of methyl 3-keto-11α-(para-toluenesulfonyloxy)-4,17(20)-pregnadiene-21-oate which, after crystallization from a mixture of 25 milliliters of hot acetone and 75 milliliters of Skellysolve B, weighed 1.03 grams, melted at 149 to 153 degrees centigrade, had an optical rotation, $[\alpha]_D$ of plus seventy degrees in acetone and the analysis below.

Calculated for $C_{29}H_{36}O_6S$: C, 67.96; H, 7.08; S, 6.25. Found: C, 68.08; H, 7.54; S, 6.25.

Similarly, other 3-keto-11α-(para-toluenesulfonyloxy)-4,17(20)-pregnadiene-21-oic acid esters are prepared by substituting other esters of 3-keto-11α-hydroxy-4,17(20)-pregnadiene-21-oic acid in the esterification reaction with para-toluenesulfonyl chloride, e. g., alkyl esters and preferably lower-alkyl esters, for example, the ethyl, propyl, butyl, amyl, hexyl, heptyl, or octyl ester.

Following the procedure described in Preparation 2, but substituting another esterifying agent which produces an 11α-sulfonyloxy ester, other methyl 3-keto-11α-(sulfonyloxy)-4,17(20)-pregnadiene-21-oates are prepared. Examples include those wherein the sulfonyloxy group is m-toluenesulfonyloxy, benzenesulfonyloxy, para-biphenylsulfonyloxy, para-methoxybenzenesulfonyloxy, 2,6-dimethylbenzenesulfonyloxy, or the sulfonyloxy groups produced by the reaction of methyl 3-keto-11α-hydroxy-4,17(20)-pregnadiene-21-oate with an arylsulfonyl chloride shown in Tables II, IV, VI, VII, VIII, IX, X, XI, XII, XIII, XIV, XV, XVI and XVII (pages 463 to 496) of Suter, "Organic Chemistry of Sulfur," Wiley pub. (1944), which preferably contain but one acid chloride group, to produce the corresponding ester thereof. Substituting another lower-alkyl ester of 3-keto-11α-hydroxy-4,17(20)-pregnadiene-21-oic acid for the corresponding methyl ester in these reactions will produce the corresponding lower-alkyl 3-keto-11α-(sulfonyloxy)-4,17(20)-pregnadiene-21-oate.

PREPARATION 3

Methyl 3-keto-4,9(11),17(20)-pregnatriene-21-oate

A solution of 500 milligrams of methyl 3-keto-11α-(para-toluenesulfonyloxy)-4,17(20)-pregnadiene-21-oate in ten milliliters of collidine was refluxed at 172 degrees centigrade for thirty minutes. The reaction mixture was then cooled to room temperature and mixed with 100 milliliters of diethyl ether. The collidine was removed from the ether by washing with cold five percent hydrochloric acid. The ether layer was then dried over anhydrous sodium sulfate, filtered and the ether then distilled. There was thus obtained 0.316 gram of methyl 3-keto-4,9(11),17(20)-pregnatriene-21-oate which, after crystallization from a mixture of acetone and Skellysolve B, weighed 0.31 gram, a yield of 93.5 percent of the theoretical, melted at 165 to 170 degrees centigrade and had the analysis below.

Calculated for $C_{22}H_{28}O_3$: C, 77.61; H, 8.28. Found: C, 77.58; H, 8.19.

Following the procedure described in Preparation 3, methyl 3-keto-4,9(11),17(20)-pregnatriene-21-oate can be prepared by the reaction of methyl 3-keto-11α-(para-toluenesulfonyloxy)-4,17(20)-pregnadiene-21-oate with sodium acetate in boiling glacial acetic acid, refluxing methanol or absolute ethanol, five percent ethanolic potassium hydroxide, or potassium acetate in boiling aqueous acetone, sodium formate in refluxing methanol, or similar reagent.

Similarly, substituting another 11α-sulfonyloxy ester of methyl 3-keto-11α-hydroxy-4,17(20)-pregnadiene-21-oate, for example, the esters disclosed in the paragraphs following Preparation 2, in the reaction described in Preparation 3, there is also produced methyl 3-keto-4,9(11),17(20)-pregnatriene-21-oate.

Other esters of 3-keto-4,9(11),17(20)-pregnatriene-21-oic acid wherein the ester group is, for example, aralkyl, alkaryl, or preferably lower-alkyl, e. g., ethyl, propyl, butyl, amyl, hexyl, heptyl, octyl, are prepared by substituting the corresponding ester of 3-keto-11α-(para-toluenesulfonyloxy)-4,17(20)-pregnadiene-21-oic acid or other 11α-sulfonyloxy ester of an alkyl 3-keto-11α-hydroxy-4,17(20)-pregnadiene-21-oate in the reaction described in Preparation 3 or the paragraph following.

EXAMPLE 1

Methyl 3-keto-9α-bromo-11β-hydroxy-4,17(20)-pregnadiene-21-oate

To a solution of 3.40 grams (0.01 mole) of methyl 3-keto-4,9(11),17(20)-pregnatriene-21-oate in 120 milliliters of dioxane was added with stirring 1.78 grams (0.013 mole) of N-bromoacetamide and twenty milliliters of a 25 percent aqueous solution of perchloric acid. Stirring was continued for ten minutes and one gram of sodium sulfite in 300 milliliters of water was then added. The mixture was thoroughly extracted with methylene chloride and the methylene chloride extract was washed successively with cold aqueous sodium bicarbonate and water, dried with anhydrous sodium sulfate and the methylene chloride then distilled at reduced pressure. The residue was dissolved in benzene and poured over a chromatographic column of 175 grams of Florisil synthetic magnesium silicate. The column was developed with 300 milliliter portions of solvents of the following composition and order: nine of Skellysolve B hexane hydrocarbons plus five percent acetone, seven of Skellysolve B plus 7.5 percent acetone, five of Skellysolve B plus ten percent acetone and one of acetone. The Skellysolve B plus 7.5 percent acetone eluates contained the methyl 3-keto-9α-bromo-11β-hydroxy-4,17(20)-pregnadiene-21-oate which, after crystallization from a mixture of acetone and Skellysolve B, weighed 2.53 grams, a yield of 58 percent of the theoretical, and melted at 105 to 108 degrees centigrade. Recrystallization of this product from the same solvent mixture raised the melting point to 108 to 109 degrees centigrade (decomposition). Infrared spectrum analysis was consistent with the structure.

Following the procedure described in Preparation 4, other esters of 3-keto-9α-bromo-11β-hydroxy-4,17(20)-pregnadiene-21-oic acid, e. g., lower-alkyl esters, ethyl, propyl, butyl, amyl, hexyl, heptyl, octyl, are prepared by substituting the corresponding ester of 3-keto-4,9(11),17(20)-pregnatriene-21-oic acid in the reaction described in Example 1.

Methyl 3-keto-9α-iodo-11β-hydroxy-4,17(20)-pregnadiene-21-oate is prepared in a similar fashion by the addition of hypoiodous acid to methyl 3-keto-4,9(11),17(20)-pregnatriene-21-oate or by the reaction of methyl 3-keto-9α-bromo-11β-hydroxy-4,17(20)-pregnadiene-21-oate with sodium iodide. Other esters of 3-keto-9α-iodo-11β-hydroxy-4,17(20)-pregnadiene-21-oate are similarly prepared from the corresponding esters of 3-keto-9α-bromo-11β-hydroxy-4,17(20)-pregnadiene-21-oate, e. g., those named above, in the reaction with sodium iodide.

EXAMPLE 2

*Methyl 3 - keto-9:11-β-epoxy-4,17(20)-pregnadiene-21-oate*

A mixture of 2.53 grams (5.78 millimoles) of methyl 3 - keto - 9α-bromo-11β-hydroxy-4,17(20)-pregnadiene-21-oate, three grams of anhydrous potassium acetate and 100 milliliters of absolute methanol was heated at the refluxing temperature of the mixture for 2.5 hours. The cooled solution was then diluted with two volumes of water and extracted thoroughly with methylene chloride. The methylene chloride extract was dried and then the solvent evaporated therefrom at reduced pressure. The residue was dissolved in benzene and then poured over a chromatographic column of 100 grams of Florisil synethetic magnesium silicate. The column was developed with 200 milliliter portions of solvents of the following composition and order: nine of Skellysolve B plus five percent acetone, five of Skellysolve B plus 7.5 percent acetone, five of Skellysolve B plus ten percent acetone, and one of acetone. The Skellysolve B plus five percent acetone eluates contained 1.24 grams, a yield of sixty percent of the theoretical, of methyl 3-keto-9:11-β-epoxy-4,17(20)-pregnadiene-21-oate which, after crystallization from Skellysolve B containing a trace of acetone, yielded heavy needles melting at 123.5 to 125 degrees centigrade and having an optical rotation $[\alpha]_D$ in chloroform of plus 48 degrees and the analysis below.

Calculated for $C_{22}H_{28}O_4$: C, 74.13; H, 7.92. Found: C, 74.33; H, 7.83.

Substituting another ester of 3-keto-9α-bromo-11β-hydroxy-4,17(20)-pregnadiene-21-oic acid, e. g., ethyl, propyl, butyl, amyl, hexyl, heptyl, octyl, or other lower-alkyl ester, in the reaction described above is productive of the corresponding ester of 3-keto-9:11-β-oxido-4,17(20)-pregnadiene-21-oic acid.

EXAMPLE 3

*Methyl 3 - keto-9α-fluoro-11β-hydroxy-4,17(20)-pregnadiene-21-oate*

A solution of four grams (1.12 millimoles) of methyl 3 - keto - 9:11-β-oxido-4,17(20)-pregnadiene-21-oate in fifty milliliters of alcohol-free chloroform was cooled to zero degrees centigrade. To the cooled solution was added 25 milliliters of an ice cold solution of anhydrous hydrogen fluoride in alcohol-free chloroform containing about one gram of hydrogen fluoride whereupon a red color developed. The solution was stored at minus fifteen degrees centigrade for four hours with occasional stirring. The solution was then washed with aqueous sodium bicarbonate and then with water. The washed chloroform solution was dried and then distilled to dryness. The partially crystalline residue was dissolved in benzene and poured over a column of 200 grams of Florisil synthetic magnesium silicate. The column was developed wtih 200 milliliter portions of solvents of the following composition and order: ten of Skellysolve B plus five percent acetone, five of Skellysolve B plus 7.5 percent acetone, five of Skellysolve B plus ten percent acetone, and one of acetone. The Skellysolve B plus 7.5 percent acetone eluates contained the methyl 3-keto-9α - fluoro - 11β-hydroxy-4,17(20)-pregnadiene-21-oate which, after crystallization from a mixture of acetone and Skellysolve B, melted at 245 to 247 degrees centigrade, had an infrared spectrum absorption consistent with the structure and the analysis below. The Skellysolve B plus five percent acetone eluates contained 1.40 grams of starting steroid.

Calculated for $C_{22}H_{29}FO_4$: C, 70.19; H, 7.76; F, 5.05. Found: C, 70.28; H, 7.71; F, 4.86.

Following the procedure described in Example 3, ethyl 3-keto-9:11-β-oxido-4,17(20)-pregnadiene-21-oate is similarly converted to ethyl 3-keto-9α-fluoro-11β-hydroxy-4,17(20)-pregnadiene-21-oate. Other esters of 3-keto-9:11-β-oxido-4,17(20)-pregnadiene-21-oic acid are similarly converted to the corresponding esters of 3-keto-9α-fluoro - 11β - hydroxy - 4,17(20) - pregnadiene - 21 - oic acid. Preferred esters of 3-keto-9:11-β-oxido-4,17(20)-pregnadiene-21-oic acid are those substantially unaffected by the hydrofluoric acid, e. g., hydrocarbon esters, especially saturated hydrocarbon esters, and particularly alkyl esters, preferably containing from one to eight carbon atoms, inclusive, e. g., methyl, ethyl, propyl, isopropyl, butyl, isobutyl, sec-butyl, amyl, hexyl, heptyl, and octyl esters of 3-keto-9:11-β-oxido-4,17(20)-pregnadiene-21-oic acid which are converted to the corresponding esters of 3-keto-9α-fluoro-11β-hydroxy-4,17(20)-pregnadiene-21-oic acid.

EXAMPLE 4

*Methyl 3-keto-9α-chloro-11β-hydroxy-4,17(20)-pregnadiene-21-oate*

Following the procedure described in Example 3, but substituting hydrogen chloride for the hydrogen fluoride, methyl 3-keto-9:11-β-oxido-4,17(20)-pregnadiene-21-oate is converted to methyl 3-keto-9α-chloro-11β-hydroxy-4,17 (20)-pregnadiene-21-oate. Similarly, other alkyl esters of 3-keto-9:11-β-oxido-4,17(20)-pregnadiene-21-oic acid, e. g., ethyl, propyl, isopropyl, butyl, amyl, hexyl, heptyl, octyl, or the like ester is converted to the corresponding alkyl esters of 3-keto-9α-chloro-11β-hydroxy-4,17(20)-pregnadiene-21-oic acid.

EXAMPLE 5

*The 3-ethylene glycol ketal of methyl 3-keto-9α-fluoro-11β-hydroxy-4,17(20)-pregnadiene-21-oate*

A mixture of 430 milligrams (1.4 millimoles) of methyl 3 - keto - 9α - fluoro - 11β - hydroxy - 4,17(20)-pregnadiene-21-oate, three milliliters of ethylene glycol, 100 milligrams of para-toluenesulfonic acid monohydrate and fifty milliliters of anhydrous benzene was heated at the refluxing temperature of the mixture for six hours with concomitant and continuous removal of the water of reaction with a Dean-Stark water trap. The mixture was then cooled, washed with aqueous sodium bicarbonate and then with water, and distilled at reduced pressure to dryness. The crude crystalline residue consisted essentially of the 3-ethylene glycol ketal of methyl 3-keto-9α-fluoro-11β-hydroxy-4,17(20)-pregnadiene-21-oate.

Following the procedure described in Example 5, other 3-ketals of methyl 3-keto-9α-fluoro-11β-hydroxy-4,17(20)-pregnadiene-21-oate are prepared by the reaction of methyl 3-keto-9α-fluoro-11β-hydroxy-4,17(20)-pregnadiene-β-diol, e. g., lower-alkane-α- and β-diols, propylene glycol, trimethylene glycol, butane-2,3-diol, pentane-1,2-diol, pentane-2,4-diol, hexane-1,3-diol, heptane-1,2-diol, octane-1,2-diol, etc.

Similarly, substituting other esters of 3-keto-9α-fluoro-11β-hydroxy-4,17(20)-pregnadiene-21-oic acid as the starting steroid in the reaction described in Example 5 is productive of the 3-ethylene glycol ketal of these esters of 3-keto-9α-fluoro-11β-hydroxy-4,17(20)-pregnadiene-21-oic acid, e. g., the 3-ethylene glycol ketal of alkyl 3-keto-9α - fluoro - 11β - hydroxy - 4,17(20) - pregnadiene - 21-oates wherein the alkyl group is ethyl, propyl, isopropyl, isobutyl, sec-butyl, amyl, hexyl, heptyl, octyl, etc. Substituting other alcohols and glycols in the reaction, e. g., the alkane-α-diols and alkane-β-diols named above, is productive of the corresponding 3-ketal of the starting alkyl 3-keto-9α-fluoro-11β-hydroxy-4,17(20)-pregnadiene-21-oate.

EXAMPLE 6

*The 3-ethylene glycol ketal of methyl 3-keto-9α-chloro-11β-hydroxy-4,17(20)-pregnadiene-21-oate*

Following the procedure described in Example 5, but substituting methyl 3-keto-9α-chloro-11β-hydroxy-4,17(20)-pregnadiene-21-oate for the methyl 3-keto-9α-fluoro-11β-hydroxy-4,17(20)-pregnadiene-21-oate, there is thus produced the 3-ethylene glycol ketal of methyl 3-keto-9α-chloro-11β-hydroxy-4,17(20)-pregnadiene-21-oate.

Similarly, substituting other alkane-α-diols or alkane-β-diols, e. g., lower-alkane-α- and β-diols, propylene glycol, trimethylene glycol, butane-2,3-diol, pentane-1,2-diol, pentane-2,4-diol, hexane-1,3-diol, heptane-1,2-diol, octane-1,2-diol, as the ketalizing agent in the reaction described above, the corresponding 3-cyclic ketals of methyl 3-keto-9α-chloro-11β-hydroxy-4,17(20)-pregnadiene-21-oate are prepared.

Substituting other esters of 3-keto-9α-chloro-11β-hydroxy-4,17(20)-pregnadiene-21-oic acid in this reaction is productive of the ketal produced by the reaction of the selected alkane-α-diol or alkane-β-diol and the selected ester of 3-keto-9α-chloro-11β-hydroxy-4,17(20)-pregnadiene-21-oic acid.

EXAMPLE 7

*Methyl 3-pyrrolidyl-9α-fluoro-11β-hydroxy-3,5,17(20)-pregnatriene-21-oate*

Methyl 3-pyrrolidyl-9α-fluoro-11β-hydroxy-3,5,17(20)-pregnatriene-21-oate is prepared by the reaction of methyl 3-keto-9α-fluoro-11β-hydroxy-4,17(20)-pregnadiene-21-oate with pyrrolidine in benzene, at the refluxing temperature of the mixture at slightly reduced pressure, in the presence of a reaction catalyst of paratoluenesulfonic acid. The water of reaction is continuously removed with a watertrap.

Substituting other alkyl esters of 3-keto-9α-fluoro-11β-hydroxy-4,17(20)-pregnadiene-21-oic acid as starting material for the enamine reaction is productive of the corresponding alkyl 3-pyrrolidyl-9α-fluoro-11β-hydroxy-3,5,17(20)-pregnatriene-21-oate. Substituting another active secondary amine as reactant, preferably a cyclic amine, e. g., alkylpyrrolidines, 2-methylpyrrolidine, piperidine, alykylpiperidines, 3-methylpiperidine, morpholine, etc., is productive of the corresponding alkyl 3-amino-9α-fluoro-11β-hydroxy-3,5,17(20)-pregnatriene-21-oate.

Substituting the corresponding alkyl 9α-chloro-11β-hydroxy-4,17(20)-pregnadiene-21-oate in any of the enamine reactions described above is productive of the corresponding alkyl 3-amino-9α-chloro-11β-hydroxy-3,5,17(20)-pregnatriene-21-oate, e. g., methyl 3-pyrrolidyl-9α-chloro-11β-hydroxy-3,5,17(20)-pregnatriene-21-oate.

EXAMPLE 8

*Methyl 3-ethoxy-9α-fluoro-11β-hydroxy-3,5,17(20)-pregnatriene-21-oate*

Reacting methyl 3-keto-9α-fluoro-11β-hydroxy-4,17(20)-pregnadiene-21-oate with ethyl alcohol in the presence of boron trifluoride at the refluxing temperature of the ethyl alcohol is productive of methyl 3-ethoxy-9α-fluoro-11β-hydroxy-3,5,17(20)-pregnatriene-21-oate. Similarly, substituting methyl alcohol, benzyl alcohol, ethyl mercaptan, or other enol etherifying alcohol or mercaptan, preferably in an inert organic solvent, e. g., benzene, toluene, etc., and preferably with removal of the water of reaction, the corresponding 3-enol ethers of methyl 3-keto-9α-fluoro-11β-hydroxy-4,17(20)-pregnadiene-21-oate and these agents are prepared. Substituting other alkyl esters of 3-keto-9α-fluoro-11β-hydroxy-4,17(20)-pregnadiene-21-oic acid, e. g., ethyl, propyl, isopropyl, butyl, amyl, isoamyl, hexyl, heptyl, octyl, etc., for the methyl ester shown above is productive of the corresponding 3-enol etherified alkyl ester of 3-keto-9α-fluoro-11β-hydroxy-4,17(20)-pregnadiene-21-oate.

Substituting the corresponding 9α-chloro compound for one of the 9α-fluoro compounds named above, e. g., methyl 3-keto-9α-chloro-11β-hydroxy-4,17(20)-pregnadiene-21-oate, as starting steroid, results in the production of a 3-enol ether of these 9α-chloro compounds, e. g., methyl 3-ethoxy-9α-chloro-11β-hydroxy-3,5,17(20)-pregnatriene-21-oate.

EXAMPLE 9

*The 3-ethylene glycol ketal of 9α-fluoro-11β,21-dihydroxy-4,17(20)-pregnadiene-3-one*

The crude crystalline ketal obtained as the reaction product of a ketalization conducted in exactly the manner described in Example 5 was dissolved in 25 milliliters of benzene and then added dropwise to a stirred suspension of 0.5 gram of lithium aluminum hydride and fifty milliliters of ether. After the addition of the benzene solution was completed, the stirring was continued for 1.5 hours. The excess lithium aluminum hydride in the reaction mixture was then decomposed by the dropwise addition of five milliliters of ethyl acetate. Ten milliliters of water was then slowly added to the mixture followed by 25 milliliters of solution of five milliliters of concentrated hydrochloric acid and twenty milliliters of water. The benzene layer was separated and washed with an aqueous solution of sodium bicarbonate followed by water. The benzene solution was then dried and distilled to dryness to leave a distillation residue consisting essentially of the 3-ethylene glycol ketal of 9α-fluoro-11β,21-dihydroxy-4,17(20)-pregnadiene-3-one.

Following the procedure described in Example 9, other 3-cyclic ketals of 9α-fluoro-11β,21-dihydroxy-4,17(20)-pregnadiene-3-one are prepared by the lithium aluminum hydride reduction of the corresponding 3-cyclic ketal of an ester of 3-keto-9α-fluoro-11β-hydroxy-4,17(20)-pregnadiene-21-oate, e. g., the 3-propylene glycol ketal, 3-trimethylene glycol ketal, 3-butane-1,2-diol ketal, 3-pentane-1,2-diol ketal, 3-pentane-2,4-diol ketal, hexane-1,3-diol ketal, heptane-1,2-diol ketal, octane-1,2-diol ketal of, for example, the methyl ester of 3-keto-9α-fluoro-11β-hydroxy-4,17(20)-pregnadiene-21-oic acid, or other alkyl ester, e. g., ethyl, propyl, isopropyl, isobutyl, sec-butyl, amyl, hexyl, heptyl, octyl, etc.

EXAMPLE 10

*The 3-ethylene glycol ketal of 9α-chloro-11β,21-dihydroxy-4,17(20)-pregnadiene-3-one*

Following the procedure described in Example 9, but substituting the 3-ethylene glycol ketal of methyl 3-keto-9α-chloro-11β-hydroxy-4,17(20)-pregnadiene-21-oate or other alkyl ester thereof as the starting steroid in the reduction, is productive of the 3-ethylene glycol ketal of 9α-chloro-11β,21-dihydroxy-4,17(20)-pregnadiene-3-one.

Substituting other 3-cyclic ketals of methyl 3-keto-9α-chloro-11β-hydroxy-4,17(20)-pregnadiene-21-oate, wherein the 3-cyclic ketal is, e. g., the propylene glycol, trimethylene glycol, butane-2,3-diol, pentane-1,2-diol, pentane-2,4-diol, hexane-1,3-diol, heptane-1,2-diol, or octane-1,2-diol ketal, as starting steroid in the reaction described in Example 9 is productive of the corresponding 3-cyclic ketal of 9α-chloro-11β,21-dihydroxy-4,17(20)-pregnadiene-3-one.

EXAMPLE 11

*3-pyrrolidyl-9α-fluoro-11β,21-dihydroxy-3,5,17(20)-pregnatriene*

Following the procedure described in Example 9, but substituting methyl 3-pyrrolidyl-9α-fluoro-11β-hydroxy-3,5,17(20)-pregnatriene-21-oate or other alkyl ester thereof as the starting steroid, there is produced 3-pyrrolidyl-9α-fluoro-11β,21-dihydroxy-3,5,17(20)-pregnatriene.

Substituting other 3-enamines of methyl or other alkyl ester of 3-keto-9α-fluoro-11β-hydroxy-4,17(20)-pregnadiene-21-oate, e. g., methyl or other alkyl ester of 3-piperidyl, 3-(alkylpyrrolidyl), 3-(2'-methylpyrrolidyl), 3-alkylpiperidyl), 3-(3'-methylpiperidyl), or 3-morpholyl-9α - fluoro - 11β - hydroxy - 3,5,17(20) - pregnatriene-21-oic acid, as starting steroid in the reduction is productive of the corresponding 3-enamine of 9α-fluoro-11β,21-dihydroxy-4,17(20)-pregnadiene-3-one.

Substituting the corresponding 9α-chloro compound for one of the 9α-fluoro enamines described in Example 11 is productive of the corresponding 3-enamine of 9α-chloro - 11β,21 - dihydroxy - 4,17(20) - pregnadiene - 3-one, e. g., 3-pyrrolidyl-9α-chloro-11β,21-dihydroxy-3,5,17(20)-pregnatriene from methyl 3-pyrrolidyl-9α-chloro-11β-hydroxy-3,5,17(20)-pregnatriene-21-oate.

Example 12

*3 - ethoxy - 9α - fluoro - 11β,21 - dihydroxy - 3,5,17(20)-pregnatriene*

Following the procedure described in Example 9, but substituting methyl 3 - ethoxy - 9α - fluoro - 11β - hydroxy-3,5,17(20)-pregnatriene-21-oate or other alkyl ester thereof as the starting steroid, there is produced 3-ethoxy-9α-fluoro-11β,21-dihydroxy-3,5,17(20)-pregnatriene.

Substituting other 3-enol ethers of methyl or other alkyl ester of 3-keto-9α-fluoro-11β-hydroxy-3,5,17(20)-pregnatrine-21-oate, e. g., methyl or other alkyl ester of 3-methoxy, 3-propoxy, 3-ethylmercapto, 3-o-methylbenzyloxy, 3-allyloxy, or 3-benzyloxy-9α-fluoro-11β-hydroxy-3,5,17(20)-pregnatriene-21-oic acid, as starting steroid in the reduction, is productive of the corresponding 3-enol ether of 9α - fluoro - 11β,21 - dihydroxy - 4,17(20)-pregnadiene-3-one.

Substituting the corresponding 9α-chloro compound for one of the 9α-fluoro compounds described in Example 12 is productive of the corresponding 3-enol ether of 9α-chloro-11β,21-dihydroxy-4,17(20) - pregnadiene - 3 - one, e. g., 3-ethoxy-9α-chloro-11β,21-dihydroxy-3,5,17(20)-pregnatriene from methyl 3-ethoxy-9α-chloro-11-hydroxy-3,5,17(20)-pregnatriene-21-oate.

Example 13

*9α-fluoro-11β,21-dihydroxy-4,17(20)-pregnadiene-3-one*

The crude 3-ethylene glycol ketal of 3α-fluoro-11β,21-dihydroxy-4,17(20)-pregnadiene-3-one, obtained as the distillation residue from the benzene solution obtained in exactly the manner described in Example 9, was dissolved in 35 milliliters of acetone. To the solution was added five milliliters of a 1.0 N solution of sulfuric acid and the acidic mixture maintained with stirring at about 25 degrees centigrade for six hours. Water was then added to the mixture. The aqueous mixture was extracted with methylene chloride and the methylene chloride extract then washed with aqueous sodium bicarbonate followed by water. The extract was dried and the solvent distilled at reduced pressure. The residue was dissolved in a mixture of benzene and methylene chloride and poured over a chromatographic column of fifty grams of Florisil synthetic magnesium silicate. The column was developed with 100 milliliter portions of solvent of the following composition and order: five of Skellysolve B plus 7.5 percent acetone, seven of Skellysolve B plus ten percent acetone, five of Skellysolve B plus fifteen percent acetone, five of Skellysolve B plus twenty percent acetone and one of acetone. The Skellysolve B plus fifteen percent acetone eluates contained 190 milligrams of product. Trituration of this product with ether followed by crystallization from a mixture of ethyl acetate and ether gave fine needles of 9α-fluoro-11β,21-dihydroxy-4,17(20)-pregnadiene-3-one melting at 202.5 to 204 degrees centigrade and having the analysis below:

Calculated for $C_{21}H_{29}FO_3$: F, 5.45. Found: F, 5.55, 5.67.

Following the procedure described in Example 13, other 3-ketals of 9α-fluoro-11β,21-dihydroxy-4,17(20)-pregnadiene-3-one, e. g., the 3-propylene glycol ketal, 3-trimethylene glycol ketal, 3-butane-1,2-diol ketal, 3-pentane-1,2-diol ketal, 3-pentane-2,4-diol ketal, hexane-1,3-diol ketal, heptane-1,2-diol ketal, octane-1,2-diol ketal of 9α - fluoro-11β,21-dihydroxy-4,17(20)-pregnadiene-3-one, are hydrolyzed to 9α-fluoro-11β,21-dihydroxy-4,17(20)-pregnadiene-3-one.

Example 14

*9α-chloro-11β,21-dihydroxy-4,17(20)-pregnadiene-3-one*

Following the procedure described in Example 13, but substituting a 3-cyclic ketal of 9α-chloro-11β,21-dihydroxy-4,17(20)-pregnadiene-3-one, e. g., the 3-ethylene glycol ketal for the corresponding 9α-fluoro compound employed as starting steroid in the reaction described in Example 13, there is thus produced 9α-chloro-11β,21-dihydroxy-4,17(20)-pregnadiene-3-one as the hydrolysis product.

Following the procedure described in Example 13, but substituting the 3-enamine or 3-enol ether of 9α-fluoro-11β,21-dihydroxy-4,17(20)-pregnadiene-3-one, e. g., 3-pyrrolidyl-9α-fluoro-11β,21-dihydroxy-3,5,17(20) - pregnatriene or 3-ethoxy-9α-fluoro-11β,21-dihydroxy-3,5,17(20)-pregnatriene, there is similarly produced 9α-fluoro-11β,21-dihydroxy-4,17(20)-pregnadiene-3-one. A 3-enamine or 3-enol ether of 9α-chloro-11β,21-dihydroxy-4,17(20)-pregnadiene-3-one, e. g., 3-pyrrolidyl-9α-chloro-11β,21-dihydroxy-3,5,17(20)-pregnatriene or 3-ethoxy-9α-chloro-11β,21-dihydroxy-3,5,17(20)-pregnatriene is hydrolized to a 9α-chloro-11β,21-dihydroxy-4,17(20)-pregnadiene-3-one. The hydrolyzing agent for the enamine is preferably an aqueous base, e. g., sodium or potassium bicarbonate or sodium hydroxide.

Example 15

*9α-fluoro-11β-hydroxy-21-acetoxy-4,17(20)-pregnadiene-3-one*

Crude 9α-fluoro-11β,21 - dihydroxy - 4,17(20) - pregnadiene-3-one, obtained from the chromatographic column of a reaction performed in exactly the manner described in Example 13, was dissolved in a mixture of five milliliters of acetic anhydride and five milliliters of pyridine. The solution was maintained at about 25 degrees centigrade for about sixteen hours and then poured into a mixture of ice and water. The gummy precipitate was extracted with methylene chloride and the extract then washed successively with ice cold dilute aqueous hydrochloric acid, cold aqueous sodium bicarbonate and finally with cold water. The methylene chloride solution, after drying, was poured over a chromatographic column of 75 grams of Florisil synthetic magnesium silicate. The column was developed with 150 milliliter portions of solvent of the following composition and order: five of Skellysolve B plus five percent acetone, eight of Skellysolve B plus 7.5 percent acetone, five of Skellysolve B plus ten percent acetone and one of acetone. The Skellysolve B plus 7.5 percent acetone eluates contained 9α-fluoro - 11β-hydroxy-21-acetoxy - 4,17(20) - pregnadiene-3-one which, after crystallization from a mixture of acetone and Skellysolve B, melted at 205 to 207.5 degrees centigrade and had the analysis below.

Calculated for $C_{23}H_{31}FO_4$: F, 4.87. Found: F, 4.24.

Following the procedure described in Example 15, or by known other procedures for the esterification of a steroidal hydroxy group, e. g., by reaction with the appropriate acid anhydride, acid chloride or bromide, ester by ester exchange, acid in the presence of an esterification catalyst, etc., 9α-fluoro-11β,21-dihydroxy-4,17-(20)-pregnadiene-3-one is similarly converted to other 21-esters thereof. Examples of 9α-fluoro-11β-hydroxy-21-acyloxy-4,17(20)-pregnadiene-3-one prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e. g., 3β-hydroxycholanic, 3β-hydroxyetiocholanic cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid, e. g., succinic, glutaric, α-methylglutaric, β-methylglutaric, β,β-dimethylglutaric, adipic, pimelic, suberic, a hydroxyacid, e. g., glycolic, lactic, citric, tartaric d-maleic, d-glyceric, mannoic, gluconic, salicylic, an aminoacid, e. g., glycine, diglycollamic, triglycollamic, methylglycine, dimethylglycine, diethylglycine, para-aminosalicylic, para-aminobenzoic, other hetero-substituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

Alternatively, the 21-hydroxy group of 9α-fluoro-11β,21-dihydroxy-4,17(20)-pregnadiene-3-one can be converted to another 21-derivative leaving the remainder of the molecule unchanged. Examples of such 21-derivatives are 21-ethers, e. g., 21-methoxy, ethoxy, benzyloxy, propoxy, α-tetrahydropyranyloxy, (β-carbethoxy-β-cyano)ethyleneoxy, β,β-dicarbethoxyethenyloxy, β-ketocyclohexenyloxy, β-trichloro-α-acetylethoxy, chloromethoxy, dimethylmethoxy, diethylmethoxy, dimethylethoxy, diethylethoxy, 21-thioesters, e. g., acetylmercapto, β-cyclopentylpropionylmercapto, triethylacetylmercapto, trimethylacetylmercapto, propionylmercapto, 21-thione esters, e. g., thioacetyloxy, thiopropionyloxy, thio-β-cyclopentylpropionyloxy, thiotriethylacetyloxy, thiotrimethylacetyloxy, imido derivatives of acetyl esters, e. g. acetimido-oxy, 21-esters of mineral acids, e. g., 21-phosphate, 21-sulfonate, 21-sulfinate, 21-methylphosphate, 21-methylsulfonate, 21-methylsulfinate, 21-bromo, fluoro or 21-chloro, esters of the carbonic acids, e. g., 21-carbonate, 21-(triethoxy)methoxy, 21-sulfonyloxy, e. g., 21-para-toluenesulfonyloxy, etc.

Example 16

9α-chloro-11β-hydroxy-21-acetoxy-4,17(20)-pregnadiene-3-one

Following the procedure described in Example 14, but substituting 9α-chloro-11β,21-dihydroxy-4,17(20)-pregnadiene-3-one as the starting steroid, there is produced 9α-chloro-11β-hydroxy-21-acetoxy-4,17(20)-pregnadiene-3-one.

Similarly, other 9α-chloro-11β-hydroxy-21-acyloxy-4,17(20)-pregnadiene-3-ones are prepared by the reaction of 9α-chloro-11β,21-dihydroxy-4,17(20)-pregnadiene-3-one with the acid chloride of, acid anhydride of, or acid named in Example 15 or the paragraph following, under the appropriate esterification conditions, wherein the acyl radical of the 21-acyloxy group is the acyl radical of the selected esterifying agent.

Example 17

9α-fluoro-11β,17α-dihydroxy-21-acetoxy-4-pregnene-3,20-dione

Approximately 125 milligrams of impure 9α-fluoro-11β-hydroxy-21-acetoxy-4,17(20)-pregnadiene-3-one, obtained from the chromatographic column from a reaction performed in exactly the manner described in Example 14, was dissolved in eight milliliters of dry tertiary butyl alcohol containing one milliliter of dry pyridine. The solution was mixed at room temperature with stirring with 0.6 milliliter of a solution of 0.165 N solution of N-methylmorpholineoxide peroxide in dry tertiary butyl alcohol. To this mixture was added five milligrams of osmium tetroxide and the solution stirred for 4.5 hours at about 25 degrees centigrade. Aqueous sodium sulfite was then added and the mixture extracted with methylene chloride. The extract was washed with water, dried and the solvent distilled. The distillation residue was dissolved in benzene and poured over a chromatographic column of fifteen grams of Florisil synthetic magnesium silicate. The column was developed with fifty milliliter portions of solvents of the following composition and order: five of Skellysolve B plus 7.5 percent acetone, five of Skellysolve B plus ten percent acetone, five of Skellysolve B plus fifteen percent acetone, three of Skellysolve B plus twenty percent acetone and one of acetone. The Skellysolve B plus fifteen percent acetone eluates were distilled to dryness leaving 47 milligrams of 9α-fluoro-11β,17α-dihydroxy-21-acetoxy-4-pregnene-3,20-dione (9-fluorohydrocortisone acetate) melting at 195 to 200 degrees centigrade.

Following the procedure described in Example 17, or employing one of the other oxidizing agents described herein, other 9α-fluoro-11β-hydroxy-21-acyloxy-4,17(20)-pregnadiene-3-ones (VI) are converted to the corresponding 9α-fluoro-11β,17α-dihydroxy-21-acyloxy-4-pregnene-3,20-diones (VII) wherein the acyl group of the starting steroid and the reaction product is the acyl radical of, for example a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylacetic, α-naphthoic, 3-methyl-α-naphthoic, an aralkyl acid, e. g., phenylacetic, phenylpropionic, diphenylacetic, triphenylacetic, a dibasic acid, e. g., succinic, glutaric, α-methylglutaric, β-methylglutaric, β,β-dimethylglutaric, adipic, pimelic, suberic, a hydroxy acid, e. g., glycolic, lactic, citric, tartaric, d-maleic, d-glyceric, mannonic, gluconic, salicylic, an aminoacid, e. g. glycine, diglycollamic, triglycollamic, methylglycine, dimethylglycine, diethylglycine, para-aminosalicylic, para-aminobenzoic, other hetero-substituted acids, e. g., ethylmercaptoacetic, benzylmercaptoacetic, cyanoacetic, chloroacetic, fluoroacetic, trichloroacetic, trifluoroacetic, thioglycolic, 2,3,4 - trimethoxybenzoic, α-napthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl - 2 - carboxylic, lysergic, pyrrolyl-2-carboxylic, or other acyl acid.

In some instances, the acyl group will be affected by the hydroxylating and/or oxidizing agent, in which instances, the acyl radical of the reaction product will differ from that of the starting material, e. g., when the acyl group is the acyl radical of an unsaturated acid, e. g., 3-butenoic acid.

Similarly, oxidative hydroxylation of the corresponding 21-derivative of 9α-fluoro-11β,21-dihydroxy-4,17(20)-pregnadiene-3-one according to one of the methods described herein is productive of 9α-fluoro-11β,17α-dihydroxy-21-substituted-4-pregnene-3,20-dione wherein the 21-substitution is a 21-ether, e. g., 21-methoxy, ethoxy, benzyloxy, propoxy, α-tetrahydropyranyloxy, (β-carbethoxy-β-cyano)methyleneoxy, β,β-dicarbethoxyethenyloxy, β-ketocyclohexenyloxy, (β-trichloro-α-acetyl)ethoxy, chloromethoxy, dimethylmethoxy, diethymethoxy, dimethylethoxy, diethylethoxy, a 21-thioester, e. g., acetylmercapto, β-cyclopentylpropionylmercapto, triethylacetylmercapto, trimethylacetylmercapto, propionylmercapto, a 21-thione ester, e. g., thioacetyloxy, thiopropionyloxy, thio-β-cyclopentylpropionyloxy, thiotriethylacetyloxy, thiotrimethylacetyloxy, an imido derivative of an acyl ester, e. g., acetimido-oxy, a 21-ester of a mineral acid, e. g., phosphate, phosphate, sulfonate, sulfinate, methylphosphate, methylsulfone, methylsulfinate, bromo, fluoro, chloro, or, for example, the 21-carbonate ester, 21-(triethoxy)methoxy ester or 21-sulfonyloxy ester, e. g., 21-para-toluenesulfonate.

EXAMPLE 18

*9α-chloro-11β,17α-dihydroxy-21-acetoxy-4-pregnene-3,20-dione*

Following the procedure described in Example 17, but substituting 9α-chloro-11β-hydroxy-21-acetoxy-4,17(20)-pregnadiene-3-one as the starting steroid in the oxidative hydroxylation, there is produced 9α-chloro-11β,17α-dihydroxy-21-acetoxy-4-pregnene-3,20-dione.

Similarly, other 9α-chloro-11β,17α-dihydroxy-21-acyloxy-4-pregnene-3,20-diones are prepared by the reaction of the selected 9α-chloro-11β-hydroxy-21-acyloxy-4,17(20)-pregnadiene-3-one with N-methylmorpholine oxide peroxide and osmium tetroxide, wherein the acyl group of the starting steroid is acetyl or the acyl radical of one of the acids named in the paragraph following Example 17.

EXAMPLE 19

*9α-fluoro-11β17α-dihydroxy-21-acetoxy-4-pregnene-3,20-dione*

To a solution of 1.116 grams (3.0 millimoles) of 9α-fluoro-11β-hydroxy-21-acetoxy-4,17(20)-pregnadiene-3-one dissolved in sixty milliliters of tertiary butyl alcohol and 1.5 milliliters of pyridine is added, at 25 degrees centigrade, five milliliters of tertiary butyl alcohol containing 11.1 milligrams (0.044 millimole) of osmium tetroxide and 0.2 milliliter (0.11 millimole) of water. To the solution is then added 2.4 grams (7.5 millimoles) of phenyliodosoacetate, which completely dissolves within twenty minutes. When the reaction is substantially complete, twenty milliliters of water is added to the reaction mixture and then distilled at reduced pressure to a volume of about twenty milliliters. An additional twenty milliliters of water is added to the residue and the mixture thoroughly extracted with ethylene dichloride.

The steroidal portion of the extract consists mainly of 9α-fluoro-11β,17α-dihydroxy-21-acetoxy-4-pregnene-3,20-dione.

EXAMPLE 20

*9α-fluoro-11β,17α-dihydroxy-21-acetoxy-4-pregnene-3,20-dione*

To a solution of 744 milligrams (2.0 millimoles) of 9α-fluoro-11β-hydroxy-21-acetoxy-4,17(20)-pregnadiene-3-one in thirty milliliters of tertiary butyl alcohol is added one milliliter of pyridine and 25 milligrams (0.1 millimole) of osmium tetroxide in eight milliliters of tertiary butyl alcohol. To the resulting solution is added 8.36 milliliters (5.0 millimoles) of an 0.6 molar solution of hydrogen peroxide in sodium dried tertiary butyl alcohol over a period of one hour and the mixture stirred for another hour.

The reaction mixture thus obtained is worked up as follows: 600 milligrams of sodium sulfite dissolved in 25 milliliters of water is added and, after stirring for five minutes, the resulting mixture is concentrated to about fifteen milliliters by distillation at a pressure of about fifty milliliters mercury absolute and the resulting concentrate then extracted with methylene chloride. The methylene chloride extract is dried. The steroidal product consists mainly of 9α-fluoro-11β,17α-dihydroxy-21-acetoxy-4-pregnene-3,20-dione. The glycol by-product is 9α-fluoro-11β,17α,20-trihydroxy-21-acetoxy-4-pregnene-3-one.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The process which comprises opening the oxido group of 3-keto-9:11-β-oxido-4,17(20)-pregnadiene-21-oic acid alkyl ester with a hydrohalic acid selected from the group consisting of hydrochloric acid and hydrofluoric acid, under substantially anhydrous conditions, to produce 3-keto-9α-halo-11β-hydroxy-4,17(20)-pregnadiene-21-oic acid alkyl ester.

2. The process of claim 1 wherein the hydrohalic acid is hydrofluoric acid.

3. The process of claim 1 wherein the hydrohalic acid is hydrofluoric acid and the starting steroid is 3-keto-9:11-β-oxido-4,17(20)-pregnadiene-21-oic acid methyl ester.

4. The process of claim 1 wherein the hydrohalic acid is hydrochloric acid and the starting steroid is 3-keto-9:11-β-oxido-4,17(20)-pregnadiene-21-oic acid methyl ester.

5. 3-keto-9α-halo-11β-hydroxy-4,17(20)-pregnadiene-21-oic acid lower-alkyl ester represented by the following formula:

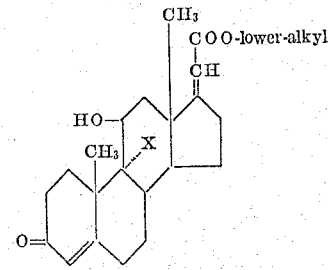

wherein X is a halogen having an atomic weight from 19 to 127 inclusive.

6. A lower-alkyl 3-keto-9α-fluoro-11β-hydroxy-4,17(20)-pregnadiene-21-oate represented by the following formula:

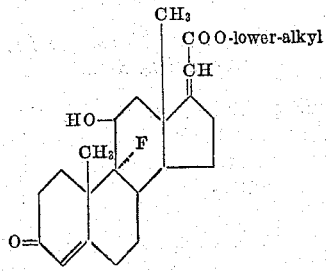

7. Methyl 3-keto-9α-fluoro-11β-hydroxy-4,17(20)-pregnadiene-21-oate.

8. Ethyl 3-keto-9α-fluoro-11β-hydroxy-4,17(20)-pregnadiene-21-oate.

9. Methyl 3-keto-9α-chloro-11β-hydroxy-4,17(20)-pregnadiene-21-oate.

10. Ethyl 3 - keto - 9α - chloro - 11β - hydroxy-4,17(20)-pregnadiene-21-oate.

11. Methyl 3 - keto - 9α - bromo - 11β - hydroxy-4,17(20)-pregnadiene-21-oate.

12. The process which comprises the steps of opening the oxido group of 3-keto-9:11-β-oxido-4,17(20)-pregnadiene-21-oic acid alkyl ester with a hydrohalic acid selected from the group consisting of hydrochloric acid and hydrofluoric acid, under substantially anhydrous conditions, to produce 3-keto-9α-halo-11β-hydroxy-4,17(20)-pregnadiene-21-oic acid alkyl ester wherein the 9α-halo group is a halogen having an atomic weight from 19 to 36, inclusive; and converting the 3-keto group of the thus-produced 9α-halo steroid to a reduction stable ketonic derivative selected from the group consisting of 3-enol ether, 3-ketal and 3-enamine, to produce 3-keto-9α - halo - 11β - hydroxy - 4,17(20) - pregnadiene - 21-oic acid alkyl ester, protected at the 3-position from reduction.

13. The process of claim 12 wherein the hydrohalic acid is hydrofluoric acid and the reduction stable ketonic derivative is a 3-ketal.

14. The process of claim 12 wherein the hydrohalic acid is hydrofluoric acid and the reduction stable ketonic derivative is the 3-ethylene glycol ketal.

15. The process of claim 12 wherein the hydrohalic acid is hydrofluoric acid, the reduction stable ketonic derivative is the 3-ethylene glycol ketal, and the starting steroid is methyl 3-keto-9:11-β-oxido-4,17(20)-pregnadiene-21-oate.

16. The process of claim 12 wherein the hydrohalic acid is hydrochloric acid, the reduction stable ketonic derivative is the 3-ethylene glycol ketal, and the starting steroid is methyl 3-keto-9:11-β-oxido-4,17(20)-pregnadiene-21-oate.

17. 3-ketalized lower-alkyl 3-keto-9α-halo-11β-hydroxy-4,17(20)-pregnadiene-21-oates represented by the following formula:

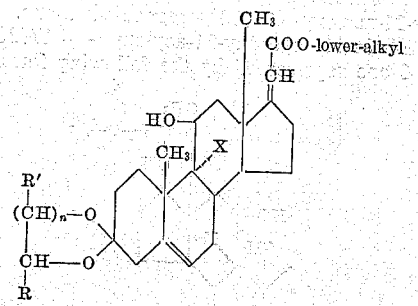

wherein R and R' are each selected from the group consisting of hydrogen and lower-alkyl, n is a whole number from one to two, and the divalent ketal radical contains less than nine carbon atoms, and X is a halogen having an atomic weight from 19 to 36, inclusive.

18. 3-ketalized lower-alkyl 3-keto-9α-halo-11β-hydroxy-4,17(20)-pregnadiene-21-oates represented by the following formula:

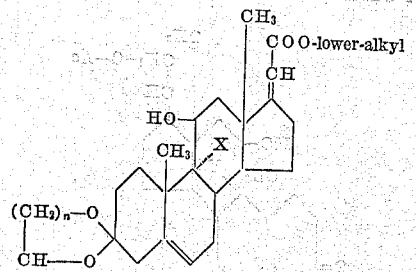

wherein X is a halogen having an atomic weight from 19 to 36, inclusive and n is a whole number from one to two.

19. 3-ketalized lower-alkyl 3-keto-9α-fluoro-11β-hydroxy-4,17(20)-pregnadiene-21-oates represented by the following formula:

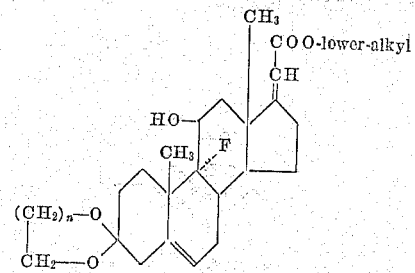

wherein n is a whole number from one to two.

20. The 3-ethylene glycol ketal of methyl 3-keto-9α-fluoro-11β-hydroxy-4,17(20)-pregnadiene-21-oate.

21. The 3-ethylene glycol ketal of ethyl 3-keto-9α-fluoro-11β-hydroxy-4,17(20)-pregnadiene-21-oate.

22. The 3-ethylene glycol ketal of methyl 3-keto-9α-chloro-11β-hydroxy-4,17(20)-pregnadiene-21-oate.

23. The 3-ethylene glycol ketal of ethyl 3-keto-9α-chloro-11β-hydroxy-4,17(20)-pregnadiene-21-oate.

24. The process which comprises the steps of opening the oxido group of 3-keto-9:11-β-oxido-4,17(20)-pregnadiene-21-oic acid alkyl ester with a hydrohalic acid selected from the group consisting of hydrochloric acid and hydrofluoric acid, under substantially anhydrous conditions, to produce 3-keto-9α-halo-11β-hydroxy-4,17(20)-pregnadiene-21-oic acid alkyl ester; converting the 3-keto group of the thus-produced 9α-halo steroid to a reduction stable ketonic derivative selected from the group consisting of 3-enol ethers, 3-ketals and 3-enamines to produce 3-keto-9α-halo-11β-hydroxy-4,17(20) - pregnadiene-21-oic acid alkyl ester, protected at the 3-position from reduction; and reducing the thus-protected 9α-halo steroid with lithium aluminum hydride to produce 9α-halo-11β,21-dihydroxy-4,17(20)-pregnadiene-3 - one, protected at the 3-position from reduction.

25. The process of claim 24 wherein the hydrohalic acid is hydrofluoric acid and the reduction stable ketonic derivative is a 3-ketal.

26. The process of claim 24 wherein the hydrohalic acid is hydrofluoric acid and the reduction stable ketonic derivative is the 3-ethylene glycol ketal.

27. The process of claim 24 wherein the hydrohalic acid is hydrofluoric acid, the reduction stable ketonic derivative is the 3-ethylene glycol ketal, and the starting steroid is methyl 3-keto-9:11-β-oxido-4,17(20)-pregnadiene-21-oate.

28. The process of claim 24 wherein the hydrohalic acid is hydrochloric acid, the reduction stable ketonic derivative is the 3-ethylene glycol ketal, and the starting steroid is methyl 3-keto-9:11-β-oxido-4,17(20)-pregnadiene-21-oate.

29. 3-ketalized-9α-halo - 11β,21 - dihydroxy - 4,17(20)-pregnadiene-3-one represented by the following formula:

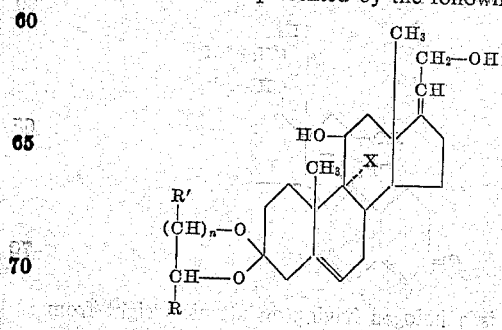

wherein R and R' are selected from the group consisting of hydrogen and lower-alkyl groups, n is a whole number from one to two, and the divalent ketal radical contains less than nine carbon atoms and X is a halogen having an atomic weight from 19 to 36, inclusive.

30. 3-ketalized-9α-fluoro-11β,21-dihydroxy - 4,17(20)-pregnadiene-3-one represented by the following formula:

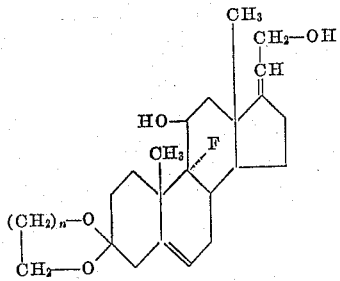

wherein *n* is a whole number from one to two, inclusive.

31. The 3-ethylene glycol ketal of 9α-chloro-11β,21-dihydroxy-4,17(20)-pregnadiene-3-one.

32. The 3-ethylene glycol ketal of 9α-fluoro-11β,21-dihydroxy-4,17(20)-pregnadiene-3-one.

33. The process which comprises the steps of opening the oxido group of 3-keto-9:11-β-oxido-4,17(20)-pregnadiene-21-oic acid alkyl ester with a hydrohalic acid selected from the group consisting of hydrochloric acid and hydrofluoric acid, under substantially anhydrous conditions, to produce 3-keto-9α-halo-11β-hydroxy-4,17(20)-pregnadiene-21-oic acid alkyl ester; converting the 3-keto group of the thus-produced 9α-halo steroid to a reduction stable ketonic derivative selected from the group consisting of 3-enol ethers, 3-ketals and 3-enamines, to produce 3-keto-9α-halo-11β-hydroxy-4,17(20)-pregnadiene-21-oic acid alkyl ester, protected at the 3-position from reduction; reducing the thus-protected 9α-halo steroid with lithium aluminum hydride to produce 9α-halo-11β,21 - dihydroxy-4,17(20)-pregnadiene-3-one, protected at the 3-position from reduction; hydrolyzing the protecting group at the 3-position of the thus-produced 9α-halo-11β,21-dihydroxy steroid with a hydrolyzing agent to produce 9α - halo - 11β,21-dihydroxy-4,17(20)-pregnadiene-3-one.

34. The process of claim 33 wherein the hydrohalic acid is hydrofluoric acid and the reduction stable ketonic derivative is a 3-ketal.

35. The process of claim 33 wherein the hydrohalic acid is hydrofluoric acid and the reduction stable ketonic derivative is the 3-ethylene glycol ketal.

36. The process of claim 33 wherein the hydrohalic acid is hydrofluoric acid, the reduction stable ketonic derivative is the 3-ethylene glycol ketal, and the starting steroid is methyl 3-keto-9:11-β-oxido-4,17(20)-pregnadiene-21-oate.

37. The process of claim 33 wherein the hydrohalic acid is hydrochloric acid, the reduction stable ketonic derivative is the 3-ethylene glycol ketal, and the starting steroid is methyl 3 - keto-9:11 - β - oxido-4,17(20)-pregnadiene-21-oate.

38. 9α-halo-11β,21-dihydroxy-4,17(20) - pregnadiene-3-one represented by the following formula:

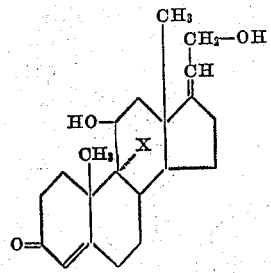

wherein X is a halogen having an atomic weight from 19 to 36, inclusive.

39. 9α-chloro-11β,21-dihydroxy - 4,17(20) - pregnadiene-3-one.

40. 9α-fluoro-11β,21-dihydroxy - 4,17(20) - pregnadiene-3-one.

41. The process which comprises the steps of opening the oxido group of 3-keto-9:11-β-oxido-4,17(20)-pregnadiene-21-oic acid alkyl ester with a hydrohalic acid selected from the group consisting of hydrochloric acid and hydrofluoric acid, under substantially anhydrous conditions, to produce 3-keto-9α-halo-11β-hydroxy-4,17(20)-pregnadiene-21-oic acid alkyl ester; converting the 3-keto group of the thus-produced 9α-halo steroid to a reduction stable ketonic derivative selected from the group consisting of 3-enol ethers, 3-ketals and 3-enamines, to produce 3-keto-9α-halo-11β-hydroxy-4,17(20)-pregnadiene-21-oic acid alkyl ester, protected at the 3-position from reduction; reducing the thus-protected 9α-halo steroid with lithium aluminum hydride to produce 9α-halo-11β,21-dihydroxy-4,17(20) - pregnadiene-3-one, protected at the 3-position from reduction; hydrolyzing the protecting group at the 3-position of the thus-produced 9α-halo-11β,21-dihydroxy steroid with a hydrolyzing agent to produce 9α-halo-11β,21-dihydroxy-4,17(20)-pregnadiene-3-one; and esterifying the thus-produced 9α-halo-11β,21-dihydroxy-4,17(20) - pregnadiene-3-one to produce a 21-mono ester thereof.

42. The process of claim 41 wherein the hydrohalic acid is hydrofluoric acid and the reduction stable ketonic derivative is a 3-ketal.

43. The process of claim 41 wherein the hydrohalic acid is hydrofluoric acid and the reduction stable ketonic derivative is the 3-ethylene glycol ketal.

44. The process of claim 41 wherein the hydrohalic acid is hydrofluoric acid, the reduction stable ketonic derivative is the 3-ethylene glycol ketal, and the esterifying agent is acetic anhydride, to produce 3-keto-9α-fluoro-11β-hydroxy-21-acetoxy-4,17(20)-pregnadiene-3-one.

45. The process of claim 41 wherein the hydrohalic acid is hydrochloric acid, the reduction stable ketonic derivative is the 3-ethylene glycol ketal and the esterifying agent is acetic anhydride, to produce 9α-chloro-11β-hydroxy-21-acetoxy-4,17(20)-pregnadiene-3-one.

46. 9α-halo-11β-hydroxy-21-acyloxy - 4,17(20)-pregnadiene-3-one represented by the following formula:

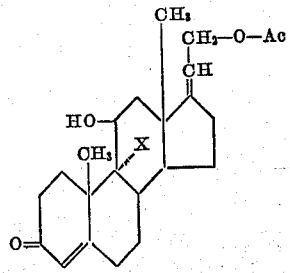

wherein X is a halogen having an atomic weight from 19 to 36, inclusive, Ac is the acyl radical of a hydrocarbon carboxylic acid having up to twelve carbon atoms, inclusive.

47. 9α-fluoro-11β-hydroxy-21-acyloxy - 4,17(20)-pregnadiene-3-one represented by the following formula:

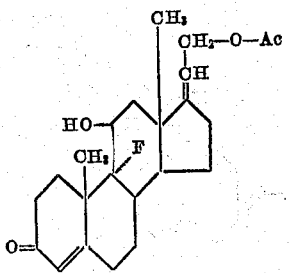

wherein Ac is the acyl radical of a hydrocarbon carboxylic acid having up to twelve carbon atoms, inclusive.

48. 9α-chloro - 11β - hydroxy-21-acyloxy - 4,17(20)-pregnadiene-3-one represented by the following formula:

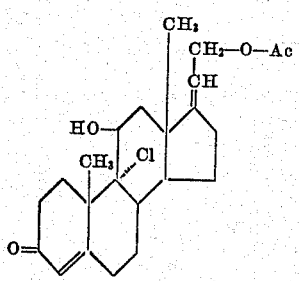

wherein Ac is the acyl radical of a hydrocarbon carboxylic acid containing up to twelve carbon atoms, inclusive.

49. 9α-fluoro-11β-hydroxy-21-acetoxy-4,17(20) - pregnadiene-3-one.

50. 9α-chloro - 11β - hydroxy-21-acetoxy - 4,17(20)-pregnadiene-3-one.

51. The process which comprises hydrolyzing 9α-halo-11β,21-dihydroxy-4,17(20)-pregnadiene-3-one, protected at the 3-position by a member of the group consisting of the 3-enol ether, the 3-ketal and 3-enamine, with a hydrolyzing agent to produce 9α-halo-11β,21-dihydroxy-4,17(20)-pregnadiene-3-one and esterifying with an esterifying agent the thus-produced 9α-halo-11β,21-dihydroxy-4,17(20)-pregnadiene-3-one to produce a 21-ester thereof.

52. The process of claim 51 wherein the esterifying agent is the anhydride of a hydrocarbon carboxylic acid containing up to twelve carbon atoms, inclusive.

53. The process of claim 51 wherein the 9α-halo-11β,21-dihydroxy-4,17(20) - pregnadiene-3-one is protected at the 3-position by an enamine group, and the halogen is fluorine.

No references cited.

UNITED STATES PATENT OFFICE

Certificate of Correction

February 24, 1959

Patent No. 2,875,200

John A. Hogg et al.

It is hereby certified that error appears in the printed specification of the above numbered patent requiring correction and that the said Letters Patent should read as corrected below.

Column 3, lines 24 to 34, Formulas VIII and XII should appear as shown below instead of as in the patent—

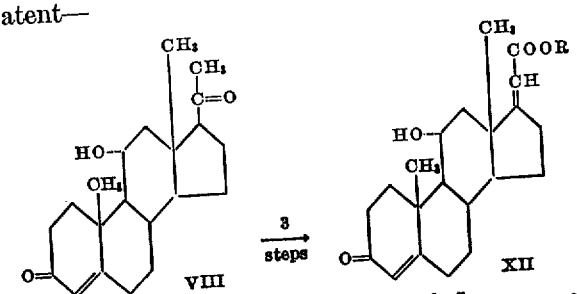

column 9, line 65, for "11α-hydroxy-" read —11β-hydroxy- —; column 20, line 36, for "to a 9α-" read —to 9α- —.

Signed and sealed this 21st day of July 1959.

[SEAL]

Attest:
KARL H. AXLINE,
Attesting Officer.

ROBERT C. WATSON,
Commissioner of Patents.